US012388294B2

(12) United States Patent
Nakada et al.

(10) Patent No.: US 12,388,294 B2
(45) Date of Patent: Aug. 12, 2025

(54) APPLIANCE MANAGEMENT METHOD, PROGRAM, POWER DISTRIBUTION EQUIPMENT, AND APPLIANCE MANAGEMENT SYSTEM

(71) Applicant: Panasonic Intellectual Property Management Co., Ltd., Osaka (JP)

(72) Inventors: Akio Nakada, Kanagawa (JP); Eisuke Tabaru, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 451 days.

(21) Appl. No.: 17/795,490

(22) PCT Filed: Jan. 13, 2021

(86) PCT No.: PCT/JP2021/000912
§ 371 (c)(1),
(2) Date: Jul. 26, 2022

(87) PCT Pub. No.: WO2021/153237
PCT Pub. Date: Aug. 5, 2021

(65) Prior Publication Data
US 2023/0231410 A1 Jul. 20, 2023

(30) Foreign Application Priority Data
Jan. 31, 2020 (JP) .................. 2020-015866

(51) Int. Cl.
*H02J 13/00* (2006.01)
(52) U.S. Cl.
CPC .. *H02J 13/00002* (2020.01); *H02J 13/00026* (2020.01); *H02J 13/0005* (2020.01); *H02J 2310/14* (2020.01)
(58) Field of Classification Search
CPC ............. H02J 13/00002; H02J 13/0005; H02J 13/00026
See application file for complete search history.

(56) References Cited

U.S. PATENT DOCUMENTS 10,523,818 B1 * 12/2019 Rathnam ................. H04W 4/38
2010/0070217 A1    3/2010 Shimada et al.
(Continued)

FOREIGN PATENT DOCUMENTS

| CN | 108134277 A | 6/2018 |
|---|---|---|
| EP | 2839496 B1 | 7/2018 |
| JP | 2008-242861 A | 10/2008 |
| JP | 2013-059247 A | 3/2013 |
| JP | 2014-072561 A | 4/2014 |
| JP | 2014-187476 A | 10/2014 |
| JP | 2017-117061 A | 6/2017 |

(Continued)

OTHER PUBLICATIONS

Notice of Reasons for Refusal dated Mar. 19, 2024 issued in the corresponding Japanese Patent Application No. 2021-083383, with English translation.

(Continued)

*Primary Examiner* — Mark A Connolly
(74) *Attorney, Agent, or Firm* — Rimon P.C.

(57) ABSTRACT

An appliance management method is designed to make power distribution equipment, provided on a power supply channel, control and/or monitor an appliance to be electrically connected to the power distribution equipment. The appliance management method includes an authentication step and a management step. The authentication step includes allowing a high-order system to perform authentication on the power distribution equipment by making the power distribution equipment access the high-order system via a public network after the power distribution equipment has been energized. The management step includes making the power distribution equipment that has been authenticated in the authentication step control and/or monitor the appliance.

14 Claims, 7 Drawing Sheets

(56) References Cited

U.S. PATENT DOCUMENTS

| | | | |
|---|---|---|---|
| 2015/0253364 A1 | 9/2015 | Hieda et al. | |
| 2016/0349779 A1 | 12/2016 | Fan et al. | |
| 2019/0081507 A1 | 3/2019 | Ide | |
| 2019/0281451 A1* | 9/2019 | Lee | H04W 12/55 |
| 2019/0305956 A1 | 10/2019 | Irani, III | |
| 2019/0379237 A1* | 12/2019 | Lu | G05B 23/0254 |
| 2020/0014761 A1 | 1/2020 | Kawaai et al. | |
| 2020/0026339 A1* | 1/2020 | Sebastian | H04L 67/125 |
| 2020/0101367 A1 | 4/2020 | Tran et al. | |
| 2020/0242902 A1 | 7/2020 | Derickson | |
| 2021/0157303 A1* | 5/2021 | Doh | G06F 1/30 |
| 2021/0194244 A1 | 6/2021 | Kawamura et al. | |
| 2021/0270876 A1* | 9/2021 | Siau | G01R 21/1331 |

FOREIGN PATENT DOCUMENTS

| | | |
|---|---|---|
| JP | 2017-527924 A | 9/2017 |
| JP | 2018-045304 A | 3/2018 |
| JP | 2018-120505 A | 8/2018 |
| WO | 2008/113052 A1 | 9/2008 |
| WO | 2013/024855 A1 | 2/2013 |
| WO | 2018/173121 A1 | 9/2018 |

OTHER PUBLICATIONS

Japanese Office Action dated Nov. 14, 2023 issued in the corresponding Japanese Patent Application No. 2021-083383, with English machine translation.

Extended European Search Report dated Jun. 21, 2023 issued in the corresponding European Patent Application No. 21747460.0.

International Search Report dated Apr. 20, 2021 issued in International Patent Application No. PCT/JP2021/000912, with English translation.

International Search Report dated Mar. 23, 2021 issued in International Patent Application No. PCT/JP2021/000913, with English translation.

Office Action issued in U.S. Appl. No. 17/795,495, dated Oct. 22, 2024.

Schmidt, Fabian. Oct. 24, 2019. How a quantum computer works. https://www.dw.com/en/how a quantum computer works/a 50969000.

Haraldsson, Páll. 2018. What is the smallest CPU currently? https://www.quora.com/What is the smallest CPU currently/answer/P%C3%A1lIHaraldssonencoded_access_token=f6ced2cc00d641e080ebc57fe0341c47&force_dialog=1&provider=google.

Jun. 2020. The World's Highest Performing Quantum Computer is Here. https://www.hone ywell.com/us/en/news/2020/06/the worlds highest performing quantum computer is here#:~:text=All%20of%20this%20infrastructure%20takes,hovering%20over%20the%20trap%20surface.

Schneider, Josh. Smalley, Ian. Aug. 5, 2024. What is quantum computing? https://www.ibm.com/topics/quantum computing#Qantum+computing+components.

Chinese Office Action dated Apr. 17, 2025 issued in the corresponding Chinese Patent Application No. 202180011829.X, with English translation.

First Office Action received in corresponding Chinese Patent Application No. 202180011829X, dated Sep. 30, 2024, (English translation).

* cited by examiner

APPLIANCE MANAGEMENT METHOD, PROGRAM, POWER DISTRIBUTION EQUIPMENT, AND APPLIANCE MANAGEMENT SYSTEM

CROSS-REFERENCE OF RELATED APPLICATIONS

This application is the U.S. National Phase under 35 U.S.C. § 371 of International Patent Application No. PCT/JP2021/000912, filed on Jan. 13, 2021, which in turn claims the benefit of Japanese Patent Application No. 2020-015866, filed on Jan. 31, 2020, the entire disclosures of which Applications are incorporated by reference herein.

TECHNICAL FIELD

The present disclosure generally relates to an appliance management method, a program, power distribution equipment, and an appliance management system. More particularly, the present disclosure relates to an appliance management method, a program, power distribution equipment, and an appliance management system, all of which are configured or designed to control and/or monitor an appliance.

BACKGROUND ART

Patent Literature 1 discloses an appliance management method. The appliance management method of Patent Literature 1 is a method for controlling, on an operating screen of a remote controller, a plurality of energy appliances, which are connected together in a building via an inhouse network. According to the appliance management method, a home server controls those appliances that establish a home network and are registered with the home server, thereby providing an operating screen for all of those appliances in a unified manner even if consumer electronic appliances made by multiple different manufacturers are installed as a mixture in the same building. In addition, this appliance control method may also display, for example, the current operating statuses of those appliances.

According to the configuration of Patent Literature 1, however, those appliances need to be connected to the home network to turn those appliances into a manageable condition. Thus, such a configuration requires the user to update the communication settings and follow other troublesome procedures all over again, every time an appliance is newly introduced into the network.

CITATION LIST

Patent Literature

Patent Literature 1: JP 2014-187476 A

SUMMARY OF INVENTION

In view of the foregoing background, it is therefore an object of the present disclosure to provide an appliance management method, a program, power distribution equipment, and an appliance management system, all of which are configured or designed to facilitate lightening the workload on the user who is attempting to turn a given appliance into a manageable condition.

An appliance management method according to an aspect of the present disclosure is designed to make power distribution equipment, provided on a power supply channel, control and/or monitor an appliance to be electrically connected to the power distribution equipment. The appliance management method includes an authentication step and a management step. The authentication step includes allowing a high-order system to perform authentication on the power distribution equipment by making the power distribution equipment access the high-order system via a public network after the power distribution equipment has been energized. The management step includes making the power distribution equipment that has been authenticated in the authentication step control and/or monitor the appliance.

A program according to another aspect of the present disclosure is designed to cause one or more processors to perform the appliance management method described above.

Power distribution equipment according to still another aspect of the present disclosure is applicable as the power distribution equipment to the appliance management method described above.

An appliance management system according to yet another aspect of the present disclosure includes: power distribution equipment provided on a power supply channel; and a high-order system. The high-order system performs authentication on the power distribution equipment when accessed by the power distribution equipment via a public network after the power distribution equipment has been energized. The power distribution equipment that has been authenticated by the high-order system controls and/or monitors an appliance to be electrically connected to the power distribution equipment.

DESCRIPTION OF EMBODIMENTS

First Embodiment (1) Overview

Figure 1:
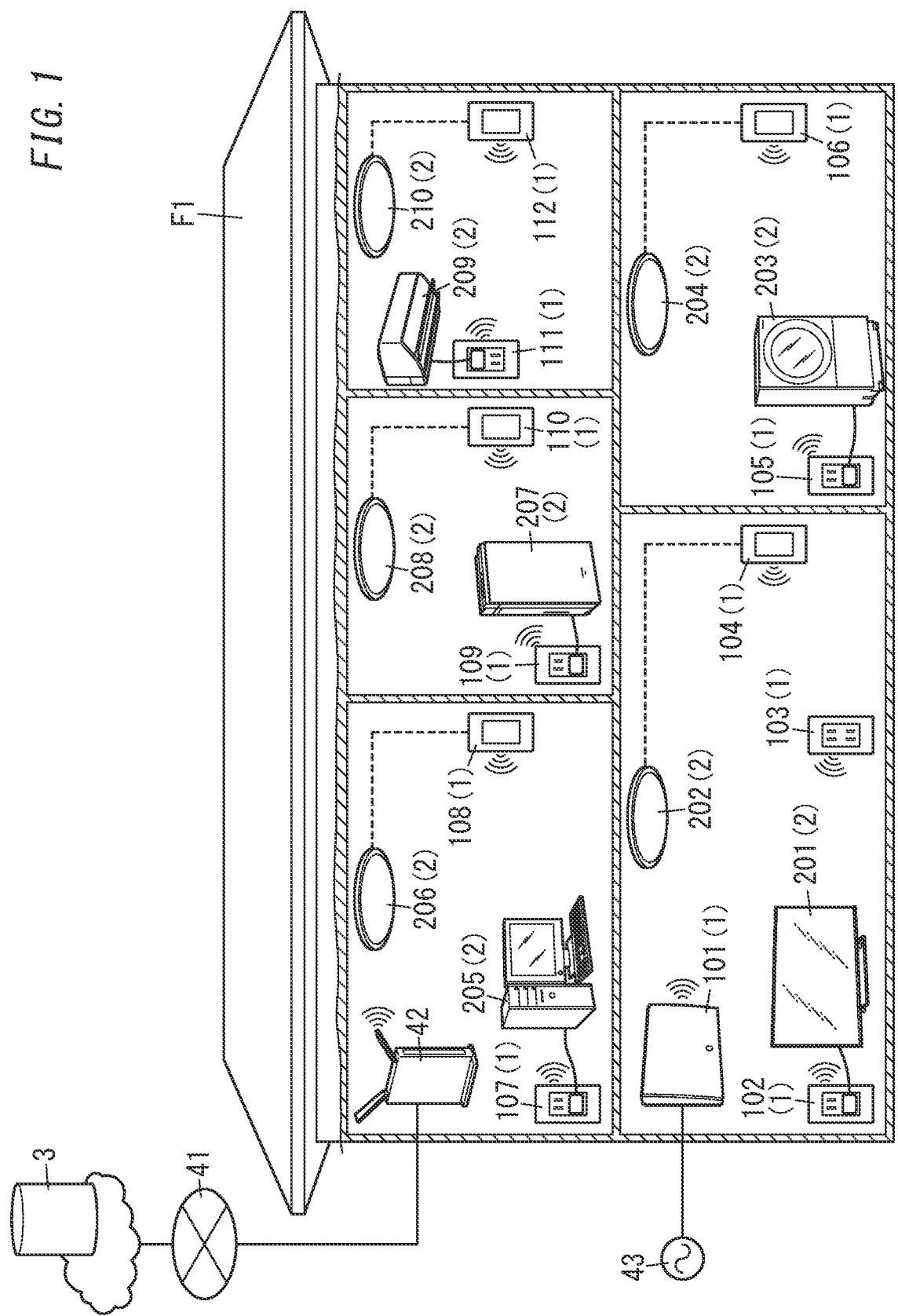
FIG. 1 is a schematic representation illustrating a facility to which an appliance management method according to a first embodiment is applied.

First, an overview of an appliance management method, program, power distribution equipment 1, and appliance management system 10 (see FIG. 2) according to an exemplary embodiment will be described with reference to FIG. 1.

An appliance management method according to this embodiment is a method for controlling and/or monitoring an appliance 2. Such an appliance management method may be used, for example, to control and/or monitor an appliance 2 installed in a facility F1. This appliance management method allows, for example, a user (who is a person and) who is currently located inside or outside of the facility F1 to control and/or monitor the appliance 2 by using a mobile communications device 51 such as a smartphone or a tablet computer (see FIG. 2). Thus, the user may manage (i.e., control or monitor) the appliance 2 remotely.

If such an appliance management method is implemented by, for example, making the mobile communications device 51 directly communicate with the appliance 2, then the communication settings need to be updated and other troublesome procedures need to be followed, every time an appliance 2 is newly introduced, with respect to the appliance 2. Among other things, for a user who is not familiarized with the technical field of communication, it may be a heavy burden to update the communication settings and follow the troublesome procedures all over again every time an appliance 2 is newly introduced.

Thus, to overcome such a problem, an appliance management method according to this embodiment includes making the power distribution equipment 1 control and/or monitor the appliance 2. In other words, an appliance management method according to this embodiment includes making the power distribution equipment 1 control and/or monitor the appliance 2 to be electrically connected to the power distribution equipment 1. The power distribution equipment 1 is provided on a power supply channel. In addition, this appliance management method includes an authentication step and a management step. The authentication step includes allowing a high-order system 3 to perform authentication on the power distribution equipment 1 by making the power distribution equipment 1 access the high-order system 3 via a public network 41 after the power distribution equipment 1 has been energized. The management step includes making the power distribution equipment 1 that has been authenticated in the authentication step control and/or monitor the appliance 2.

As can be seen, according to the appliance management method of this embodiment, the management (i.e., at least one of control or monitoring) of the appliance 2 is made by the power distribution equipment 1, and therefore, communication settings and other procedures with respect to the appliance 2 may be performed on a power distribution equipment 1 basis. This makes it easier to lighten the workload on the user about the update of the communication settings and other procedures, compared to a situation where the communication settings need to be updated and other troublesome procedures need to be followed all over again, every time an appliance 2 is newly introduced into the network (as in a situation where the communication settings and other procedures are performed on an appliance 2 basis). In addition, the power distribution equipment 1 that has been authenticated in the authentication step may be used to make management of the appliance 2 in the management step, thus lightening the workload on the user in the authentication step as well. That is to say, the authentication step includes allowing the high-order system 3 to perform authentication on the power distribution equipment 1 by making the power distribution equipment 1 access the high-order system 3 via a public network 41 after the power distribution equipment 1 has been energized. Thus, no special operation needs to be performed on the power distribution equipment 1. This allows the user to use the power distribution equipment 1 to manage the appliance 2 in the management step even without performing any special operation such as entering the name of the network or a password with respect to the power distribution equipment 1. Consequently, the appliance management method according to this embodiment achieves the advantage of facilitating lightening the workload on the user who is attempting to turn the appliance 2 into a manageable condition.

Also, a program according to this embodiment is a program to put the appliance management method described above into practice. In other words, a program according to this embodiment is designed to cause one or more processors to perform the appliance management method described above.

Furthermore, power distribution equipment 1 according to this embodiment is a piece of equipment (power distribution equipment) to put the appliance management method described above into practice. Stated otherwise, the power distribution equipment 1 according to this embodiment is applicable as the power distribution equipment 1 to the appliance management method described above.

Furthermore, an appliance management system 10 according to this embodiment is a system (appliance management system) to put the appliance management method described above into practice. Specifically, an appliance management system 10 according to this embodiment includes: power distribution equipment 1 provided on a power supply channel; and a high-order system 3. The high-order system 3 performs authentication on the power distribution equipment 1 when accessed by the power distribution equipment 1 via a public network 41 after the power distribution equipment 1 has been energized. The power distribution equipment 1 that has been authenticated by the high-order system 3 controls and/or monitors the appliance 2 to be electrically connected to the power distribution equipment 1.

(2) Details

Next, an appliance management method, a program, power distribution equipment 1, and an appliance management system 10 according to this embodiment will be described in detail with reference to FIGS. 1-6.

(2.1) Premise

As used herein, the "management" of the appliance 2 means controlling and/or monitoring the appliance 2. That is to say, the management of the appliance 2 means only controlling the appliance 2, only monitoring the appliance 2, or both controlling and monitoring the appliance 2. The appliance management method according to this embodiment is supposed to include, for example, controlling and monitoring the appliance 2 as the management of the appliance 2.

Examples of the "facility" as used herein include non-dwelling facilities such as offices, factories, buildings, stores, schools, and welfare facilities or hospitals, dwelling facilities such as single-family dwelling houses and multi-family dwelling houses, and dwelling units of a single-family dwelling house or a multi-family dwelling house. Examples of the non-dwelling facilities further include theaters, movie theaters, public halls, amusement facilities, complex facilities, restaurants, department stores, hotels, inns, kindergartens, libraries, museums, art museums, underground shopping malls, railway stations, and airports. Furthermore, examples of the "facilities" as used herein further include not only buildings (constructions) but also other types of outdoor facilities such as ballparks, gardens, parking lots, playgrounds, and public parks. In this embodiment, the facility F1 is supposed to be a single-family dwelling house, as an example.

Also, the "power distribution equipment" as used herein refers to various types of electrical equipment (including apparatuses and devices) provided on a power supply channel. For example, the power distribution equipment 1 relays or controls (including controls the ON/OFF states of) the power to be supplied to the appliance 2. The "power" as used herein may be AC power or DC power, whichever is appropriate. The power distribution equipment 1 includes various pieces of equipment fixed (installed) on an installation surface (such as a wall surface, a ceiling surface, or a floor surface) of the facility F1. Examples of the power distribution equipment 1 include distribution boards, breakers, wiring devices, EV charging stations, and wiring ducts. As used herein, the "wiring devices" refers to various pieces of equipment to be electrically connected to an electric cable (serving as prewiring) installed behind the walls or behind the ceiling. Examples of the wiring devices include outlets, switches, dimmers, timer switches, sensor switches, and ceiling rosettes. The power distribution equipment 1 further includes portable equipment, such as power strips, plugs, and adapters, which are used without being fixed on any installation surface of the facility F1. In this embodiment, the power distribution equipment 1 includes a distribution board and an embedded wiring device which are fixed (installed) on an installation surface of the facility F1.

The "appliances" as used herein refer to various types of electrical appliances to be electrically connected to the power distribution equipment 1 and may operate, for example, with the power supplied from the power distribution equipment 1. In other words, the power distribution equipment 1 is provided on the channel along which electric power is supplied to the appliances 2. The appliances 2 may be, for example, consumer electronic appliances or installations. Examples of the consumer electronic appliances include TV receivers, lighting fixtures (including ceiling fittings), and video recorders and players (including HDD/DVD recorders and external HDDs). In addition, washing machines, refrigerators, air conditioners, air purifiers, personal computers, smart loudspeakers, and computer game consoles are also counted among the consumer electronic appliances. Examples of the installations include packaged air conditioners (air conditioning equipment), lighting fixtures (including LED fluorescent lamps and spotlights), power storage equipment, kitchen equipment (including induction cookers and dish washers), access control systems, copy machines, and fax machines. In addition, housing installations such as hot water supply systems (including EcoCute®), electric shutters, ventilators, and 24-hour ventilation systems are also counted among the installations. Besides, the appliances 2 further include various types of sensors such as temperature sensors, humidity sensors, illuminance sensors, (barometric) pressure sensors, acceleration sensors, vibration sensors, sound sensors, and odor sensors. In this embodiment, the appliances 2 include, for example, consumer electronic appliances for use in the facility F1.

As used herein, the "user" refers to a person who makes management (which is at least one of control or monitoring) of the appliance 2 and may be an individual person or a juridical person, whichever is appropriate. Alternatively, the "user" may also be a group (or organization) of individual persons or juridical persons. In this embodiment, the user is supposed to be, for example, an individual person who lives in the facility F1.

As used herein, the "remote" location refers to a distant location. For example, the outside of the facility F1 (such as the outside of the premises of the facility F1) is a remote location for the facility F1. That is to say, the appliance management method according to this embodiment allows the user who lives in the facility F1 to manage (i.e., control and/or monitor), using the mobile communications device 51, the appliance 2 in the facility F1, even if the user is currently located outside the premises of the facility F1. Naturally, even if the user is currently located inside the facility F1, he or she may also manage, using the mobile communications device 51, for example, the appliance 2 in the facility F1.

(2.2) Overall System Configuration

Next, an overall configuration for a system including an appliance management system 10 as an implementation for performing the appliance management method according to this embodiment will be described with reference to FIGS. 1 and 2.

As described above, the appliance management system 10 includes the power distribution equipment 1 and the high-order system 3. In this embodiment, multiple pieces of the power distribution equipment 1 are provided for a single facility F1. The multiple pieces of the power distribution equipment 1 provided for the single facility F1 and the high-order system 3 together form the appliance management system 10. In other words, the appliance management system 10 according to this embodiment includes the multiple pieces of the power distribution equipment 1 and the high-order system 3.

In addition, the appliance management system 10 according to this embodiment and one or more appliances 2 to be managed together form an appliance system 200. Stated otherwise, the appliance system 200 according to this embodiment includes the appliance management system 10 and the one or more appliances 2.

As shown in FIG. 1, multiple pieces of the power distribution equipment 1 are provided for the single facility F1. The multiple pieces of the power distribution equipment 1 are arranged to be distributed in a plurality of rooms of the facility F1. In the example illustrated in FIG. 1, one or more pieces of the power distribution equipment 1 are installed in each room. In this embodiment, the multiple pieces of the power distribution equipment 1 include a distribution board 101 and a plurality of wiring devices 102-112. In this example, among the plurality of wiring devices 102-112, the wiring devices 102, 103, 105, 107, 109, and 111 are supposed to be outlets and the wiring devices 104, 106, 108, 110, and 112 are supposed to be switches as shown in FIG. 1. If there is no need to distinguish the distribution board 101 and the plurality of wiring devices 102-112 from each other, each of the distribution board 101 and the plurality of wiring devices 102-112 will be hereinafter simply referred to as "power distribution equipment 1."

The distribution board 101 is electrically connected to a power grid 43. The distribution board 101 may be supplied with, for example, AC power of either 100 V or 200 V at a frequency of either 50 Hz or 60 Hz from the power grid 43. The distribution board 101 includes a main breaker, a plurality of branch breakers, and a cabinet. The main breaker and the plurality of branch breakers are housed in the cabinet. The distribution board 101 is mounted on an installation surface, which is a wall surface of the facility F1. The distribution board 101 distributes the AC power supplied from the power grid 43 to a plurality of branch circuits via the plurality of branch breakers.

Each of the plurality of wiring devices 102-112 is electrically connected to the distribution board 101. In this embodiment, the wiring devices 102-112 are embedded wiring devices to be mounted on an installation surface which is a wall surface of the facility F1. That is to say, the wiring devices 102-112 are configured to be fixed on the installation surface and electrically connectible to an electric cable laid behind the installation surface. In particular, each of these wiring devices 102-112 is an embedded wiring device, of which the housing is fixed onto the installation surface with the housing at least partially embedded in an installation hole provided through the installation surface.

Among the plurality of wiring devices 102-112, the wiring devices 102, 103, 105, 107, 109, and 111, each serving as an outlet, are each configured such that one or more appliances 2 may be electrically connected thereto. That is to say, each of the wiring devices 102, 103, 105, 107, 109, and 111 has multiple pairs of holes. Into each pair of holes, the plug of an appliance 2 may be inserted. Each of the wiring devices 102, 103, 105, 107, 109, and 111 may be electrically connected to the appliance 2, of which the plug is inserted into one of the multiple pairs of holes. The wiring devices 102, 103, 105, 107, 109, and 111 are electrically connected to the distribution board 101. Thus, the wiring devices 102, 103, 105, 107, 109, and 111 provide means for supplying power to the appliances 2 at appropriate locations in the facility F1.

Among the plurality of wiring devices 102-112, the wiring devices 104, 106, 108, 110, and 112, each serving as a switch (e.g., a wall switch), are each inserted between one or more appliances 2 and the distribution board 101. As used herein, "to insert" something means inserting the thing to between two members to be electrically connected to each other. Thus, the wiring devices 104, 106, 108, 110, and 112 are each electrically connected between the distribution board 101 and associated appliance(s) 2. Therefore, the appliance(s) 2 electrically connected to any of the wiring devices 104, 106, 108, 110, and 112 will be electrically connected to the distribution board 101 via the wiring device 104, 106, 108, 110, or 112. This allows each of the wiring devices 104, 106, 108, 110, and 112 to start or stop supplying power from the distribution board 101 to associated appliance(s) 2 by selectively making the distribution board 101 and the appliance(s) 2 electrically conductive or non-conductive with each other.

Thus, in any one of the wiring devices 102-112, each serving as either an outlet or a switch, the power supplied from the power grid 43 and distributed by the distribution board 101 is delivered, via the wiring device 102-112, to the appliance 2 that is electrically connected to the wiring device 102-112. In other words, the wiring devices 102-112 are various pieces of electrical equipment (including apparatuses and devices) which are provided on the channel along which the electric power is supplied to the appliances 2. Likewise, the distribution board 101 is also one of those various pieces of electrical equipment (including apparatuses and devices) which are provided on the channel along which the power is supplied to the appliances 2. Strictly speaking, the distribution board 101 and at least one of the wiring devices 102-112 are inserted onto the power supply channel between the power grid 43 and each appliance 2.

In addition, each of these pieces of power distribution equipment 1 has communication capabilities. As will be described in detail later in the "(2.3) Details of appliance management system" section, a router 42 is installed in this embodiment in the facility F1 and each of the multiple pieces of power distribution equipment 1 is configured to be ready to communicate with the router 42. As used herein, "to be ready to communicate" means being able to transmit and receive signals either directly or indirectly via a network or a relay, for example, by an appropriate wired or wireless communication method. In this embodiment, each of the multiple pieces of power distribution equipment 1 is ready to communicate bidirectionally with the router 42 by wirelessly communication. As used herein, the "wireless communication" means communication to be established contactlessly using a radio wave as a transmission medium. Also, in this embodiment, the wireless communication to be established between each of the multiple pieces of power distribution equipment 1 and the router 42 is supposed to be wireless communication compliant with, for example, the Wi-Fi® protocol.

Also, in this embodiment, the various appliances 2 installed in the facility F1 are, for example, electrically connected to the plurality of wiring devices 102-112 as shown in FIG. 1. Specifically, the appliances 2 that are connected to the wiring devices 102, 105, 107, 109, and 111, each serving as an outlet, are a TV receiver 201, a washing machine 203, a personal computer 205, an air purifier 207, and an air conditioner 209, respectively. The appliances 2 that are connected to the wiring devices 104, 106, 108, 110, and 112, each serving as a switch, are lighting fixtures 202, 204, 206, 208, and 210, respectively. If there is no need to distinguish the TV receiver 201, the washing machine 203, the personal computer 205, the air purifier 207, the air conditioner 209, and the lighting fixtures 202, 204, 206, 208, and 210 from each other, they will be hereinafter simply referred to as "appliances 2" collectively.

Each of the lighting fixtures 202, 204, 206, 208, and 210 includes a light source such as light-emitting diodes (LEDs) and a lighting circuit for turning the light source ON. The light source turns ON when supplied with power. Thus, the wiring devices 104, 106, 108, 110, and 112 switch the lighting states of the lighting fixtures 202, 204, 206, 208, and 210, respectively, by selectively making the distribution board 101 and the lighting fixtures 202, 204, 206, 208, and 210 electrically conductive or non-conductive with each other. As used herein, the "lighting states" include ON/OFF states.

The high-order system 3 is connected to a public network 41 such as the Internet. The high-order system 3 may be implemented as, for example, a cloud computing system. The router 42 is connected to the public network 41. As described above, each of the multiple pieces of power distribution equipment 1 is ready to communicate with the router 42. This makes each of the multiple pieces of power distribution equipment 1 connectible to the public network 41 via the router 42. Thus, a communications channel including the public network 41 is established between the high-order system 3 and each of the multiple pieces of power distribution equipment 1. Although not illustrated in detail in FIG. 1 and other drawings, the router 42 is not directly connected to the public network 41 but is actually connected to the public network 41 via, for example, an optical network unit (ONU) and a fiber-optic network.

Figure 2:
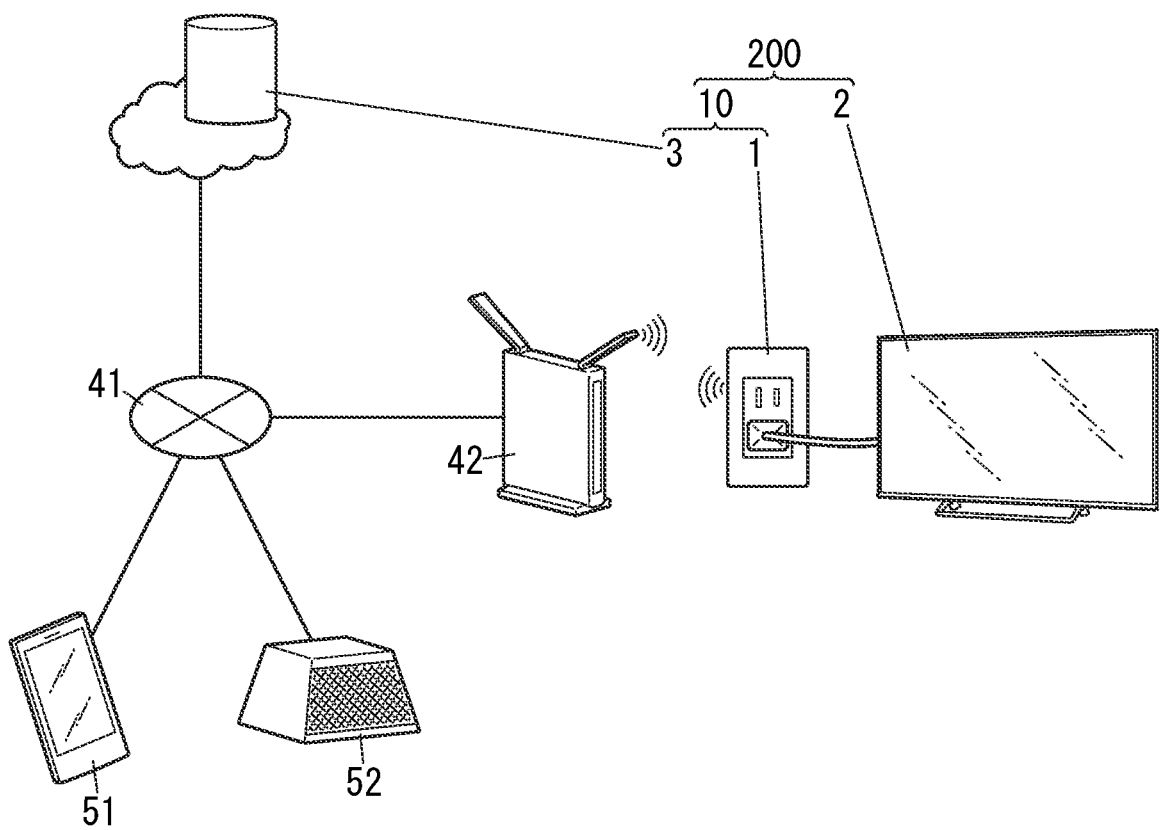
FIG. 2 depicts a schematic configuration for an appliance management system according to the first embodiment.

Also, as shown in FIG. 2, a mobile communications device 51 such as a smartphone or a tablet computer, and an operating device 52 such as a smart loudspeaker are connected to the public network 41. Specifically, the mobile communications device 51 may be connected to the public network 41 via a cellular phone network (carrier network) provided by a communications service provider or a public wireless local area network (LAN), for example. Examples of the cellular phone network include the third generation (3G) network, the long-term evolution (LTE) network, the fourth generation network (4G), and the fifth generation network (5G). This allows the mobile communications device 51 to be connected, even when the mobile communications device 51 is currently located in an environment outside of the facility F1, to the public network 41 via the cellular phone network as long as the mobile communications device 51 is connectible in that environment to the cellular phone network.

(2.3) Details of Appliance Management System

Next, a detailed configuration for the appliance management system 10 according to this embodiment will be described with reference to FIG. 3.

Figure 3:
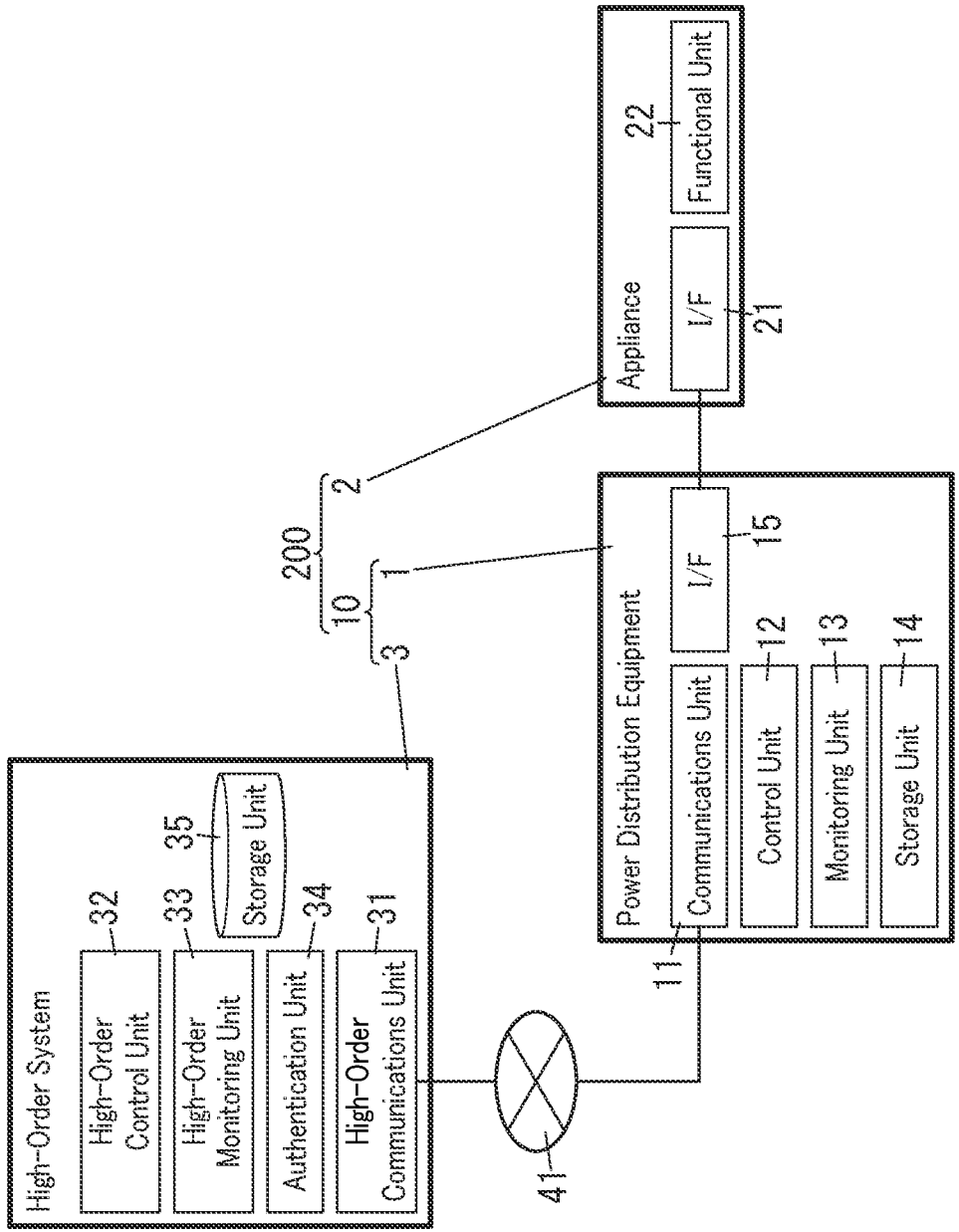
FIG. 3 is a block diagram illustrating a schematic configuration for the appliance management system.

The power distribution equipment 1 includes a communications unit 11, a control unit 12, a monitoring unit 13, a storage unit 14, and an interface 15 (abbreviated as "I/F" in FIG. 3). The power distribution equipment 1 not only includes these constituent elements but also has basic functions as the power distribution equipment, namely, the function as distribution board as for the distribution board 101 and the function as wiring device as for the wiring devices 102-112. Although only one of the multiple pieces of the power distribution equipment 1 (including the distribution board 101 and the plurality of wiring devices 102-112) is shown in FIG. 3, each of the other pieces of the power distribution equipment 1 has the same configuration as the one shown in FIG. 3.

The communications unit 11 has the capability of communicating with a high-order communications unit 31 of the high-order system 3. In this embodiment, the communications unit 11 may be connected to the public network 41 via the router 42, for example, and may communicate with the high-order system 3 via the public network 41. In this case, the communication method for the power distribution equipment 1 may be, for example, wired communication, wireless communication using a radio wave as a transmission medium, or fiber optic communication using light as a transmission medium. Examples of the wired communication include not only a communication method that uses a dedicated communications network as a transmission medium but also a power line communication (PLC) that uses a power line as a transmission medium. Examples of the wireless communication include various protocols such as Wi-Fi®, Bluetooth®, ZigBee®, and low power radio standards requiring no licenses (such as the Specified Low Power Radio standard).

In this embodiment, the communication protocol adopted by the power distribution equipment 1 is either a protocol selected from the group consisting of a wireless multi-hop, Wi-Fi®, Bluetooth®, ZigBee®, Ethernet®, power line communication, and Power over Ethernet (PoE)®, or a combination thereof. As used herein, the "communication protocol adopted by the power distribution equipment 1" refers to the communication protocols in general that the power distribution equipment 1 may use to communicate with other appliances. Thus, the "communication protocol adopted by the power distribution equipment 1" as used herein is applicable to not only communication established by the communications unit 11 with the high-order system 3 (including communication with the router 42) but also communication established by the interface 15 with the appliance 2 as well.

In this embodiment, the communication protocol adopted by the communications unit 11 may be, for example, a wireless communication compliant with the Wi-Fi® protocol. Considering that multiple pieces of power distribution equipment 1 are used in the facility F1, high-speed and stabilized communication is preferably established by the tri-band Wi-Fi® that uses three channels, in particular. According to the tri-band Wi-Fi®, a 2.4 GHz band and two 5 GHz bands called "W52•W53" and "W56" are used. The power distribution equipment 1 determines the degree of network congestion by the band steering capability and automatically guides to the least congested one of these three frequency bands, thereby establishing high-speed and stabilized communication.

The control unit 12 controls at least one appliance 2. The types of control performed by the control unit 12 on a given appliance 2 include turning ON and OFF (i.e., selectively energizing) the appliance 2 and may include fine tuning according to the function of the appliance 2. For example, if the given appliance 2 is a TV receiver 201, the control unit 12 performs, on the appliance 2, various types of control including turning ON and OFF (i.e., selectively energizing) the TV receiver 201, changing the channel for viewing, and volume control. In another example, if the appliance 2 is a lighting fixture 202, 204, 206, 208, or 210, then the control unit 12 performs, on the appliance 2, various types of control including turning ON and OFF, controlling the dimming level, and controlling the lighting color of the lighting fixture 202, 204, 206, 208, or 210. In particular, if the power distribution equipment 1 has the function as a switch as in the case of a switch or a breaker or has the function of controlling the power to be supplied to the appliance 2 as in the case of a dimmer, then the control unit 12 may control the appliance 2 indirectly by controlling the power distribution equipment 1. That is to say, if the power distribution equipment 1 is a switch, then the control unit 12 may turn ON and OFF (i.e., selectively energize) the appliance 2 by turning ON and OFF the power distribution equipment 1.

The monitoring unit 13 monitors a given appliance 2. The types of monitoring performed by the monitoring unit 13 on the appliance 2 include monitoring the ON and OFF states (i.e., energized and deenergized states) of the appliance 2 and may include monitoring the operating status more finely according to the function of the given appliance 2. For example, if the given appliance 2 is a TV receiver 201, the monitoring unit 13 monitors various states of the appliance 2 in terms of, for example, the ON and OFF states (i.e., energized and deenergized states), the channel for viewing, and the volume of the TV receiver 201. In another example, if the appliance 2 is a lighting fixture 202, 204, 206, 208, or 210, then the monitoring unit 13 monitors various states of the appliance 2 in terms of, for example, the ON and OFF states, the dimming level (brightness), and the lighting color of the lighting fixture 202, 204, 206, 208, or 210. In particular, if the power distribution equipment 1 has the function as a switch as in the case of a switch or a breaker or has the function of controlling the power to be supplied to the appliance 2 as in the case of a dimmer, then the monitoring unit 13 may monitor the appliance 2 indirectly by monitoring the operation of the power distribution equipment 1. That is to say, if the power distribution equipment 1 is a switch, then the monitoring unit 13 may monitor the ON and OFF (i.e., energized and deenergized) states of the appliance 2 by monitoring the ON and OFF states of the power distribution equipment 1.

The storage unit 14 stores, for example, information for use to access the high-order system 3 (such as the address of the high-order system 3) and identification information unique to the power distribution equipment 1. In this embodiment, the identification information may be, for example, a media access control (MAC) address. In addition, the storage unit 14 may also store, for example, information required for the control unit 12, the monitoring unit 13, and other components to make computations. The storage unit 14 includes a programmable nonvolatile memory such as an electrically erasable programmable read-only memory (EEPROM).

The interface 15 has the function of transmitting and receiving data to/from at least one appliance 2. The interface 15 is configured to be ready to communicate with the interface 21 of the appliance 2. As described above, the communication protocol adopted by the power distribution equipment 1 is either a protocol selected from the group consisting of a wireless multi-hop, Wi-Fi®, Bluetooth®, ZigBee®, Ethernet®, power line communication, and Power over Ethernet (PoE)®, or a combination thereof. In this embodiment, the communication protocol adopted by the interface 15 is the power line communication (PLC) that uses a power line as a transmission medium. The power distribution equipment 1 is provided on the channel along which electric power is supplied to the appliance 2. Thus, the power line communication enables transmitting and receiving data between the power distribution equipment 1 and the appliance 2 even without providing any additional communications channel separately from the power line (including the power cables for the appliance 2).

Among the constituent elements of the power distribution equipment 1, at least the control unit 12 and the monitoring unit 13 each include, as a major constituent element, a microcontroller including one or more processors and one or more memories, for example. The microcontroller performs the functions of the control unit 12 and the monitoring unit 13 by making the one or more processors execute a program stored in the one or more memories. The program may be stored in advance in the memory. Alternatively, the program may also be distributed after having been stored in a non-transitory storage medium such as a memory card or downloaded via a telecommunications line. In other words, the program is designed to cause the one or more processors to serve as the control unit 12 and the monitoring unit 13.

According to this embodiment, the communications unit 11, control unit 12, and monitoring unit 13 of the power distribution equipment 1 perform the three functions, namely, the telemetric function (i.e., remote information collecting function), the control function, and the network management function, of the appliance management method. The telemetric function is the function of acquiring data that has been push-transmitted from a node (i.e., a power supply destination as viewed from the power distribution equipment 1). The control function is the function of transmitting and receiving data in accordance with the semantics of a synchronized distributed database (high-order system 3). The network management function is the function of dynamically adapting a mesh network including the power distribution equipment 1 to the environment of a space in which the power distribution equipment 1 is installed (i.e., the facility F1).

In this embodiment, to perform these functions, an Open-Sync™ module manufactured by Plume Design, Inc., for example, may be installed in the power distribution equipment 1. That is to say, using a message queue telemetry transport (MQTT) as the telemetric function, the power distribution equipment 1 collects measuring information (measured value) upon the request (publish) from an appliance 2 as a node to be connected to the power distribution equipment 1. In addition, the power distribution equipment 1 converts the measuring information into a standardized format such that the measuring information may be shared by a plurality of different appliances 2 and not only makes the plurality of appliances 2 share the measuring information but also transmits the measuring information upon the request (subscribe) from the high-order system 3. To perform the control function, the power distribution equipment 1 performs not only processing the control signal from the high-order system 3 but also transmitting and receiving data, prioritizing, filtering, and blocking by using OVSDB™ as a distributed database and in accordance with the database. To perform the network management function, the power distribution equipment 1 dynamically adapts a mesh network to the environment of the space (i.e., the facility F1) by using Open vSwitch™, thereby performing, for example, connection management for the user, security check, and management of the appliance 2.

Nevertheless, the MQTT is mostly the function of receiving data from the appliance 2 via push transmission. Thus, the function of transmitting data to the destination (such as the appliance 2) to which power is to be supplied from the power distribution equipment 1 may be performed as an additional function. In that case, the data collected in the power distribution equipment 1 serving as a broker (arbitrator) may be transmitted (transferred) to, for example, the appliance 2 that is the destination to which the power is to be supplied from the power distribution equipment 1. At this time, the power distribution equipment 1 may not only receive the information by itself but also transfer the information to the appliance 2.

The high-order system 3 includes a high-order communications unit 31, a high-order control unit 32, a high-order monitoring unit 33, an authentication unit 34, and a storage unit 35.

The high-order communications unit 31 has the function of communicating with the communications unit 11 of the power distribution equipment 1. In this embodiment, the high-order communications unit 31 is connected to the public network 41 and communicates with the power distribution equipment 1 via the public network 41.

The high-order control unit 32 controls at least one appliance 2. The types of control performed by the high-order control unit 32 on the appliance 2, as well as the control unit 12 of the power distribution equipment 1, include turning ON and OFF (i.e., selectively energizing) the appliance 2 and may include fine tuning according to the function of the given appliance 2.

The high-order monitoring unit 33 monitors the appliance 2. The types of monitoring performed by the high-order monitoring unit 33 on the appliance 2, as well as the monitoring unit 13 of the power distribution equipment 1, include monitoring the ON and OFF states (i.e., energized and deenergized states) of the appliance 2 and may include monitoring the operating status more finely according to the function of the given appliance 2.

The authentication unit 34 performs authentication on the power distribution equipment 1. In this embodiment, after the power distribution equipment 1 has been energized, the authentication unit 34 is accessed by the power distribution equipment 1 via the public network 41 and performs authentication on the power distribution equipment 1. If authentication of the power distribution equipment 1 is success, the authentication unit 34 issues an IP address to the power distribution equipment 1. The operation of the authentication unit 34 will be described in detail later in the "(2.4) Appliance management method" section.

The storage unit 35 stores, as registered information, information about the power distribution equipment 1 that has been authenticated by the authentication unit 34. As used herein, the "registered information" includes at least identification information for the power distribution equipment 1. In this embodiment, the registered information includes not only the identification information for the power distribution equipment 1 but also an IP address, a user ID, a password, and other pieces of information assigned to the power distribution equipment 1. That is to say, these pieces of information about the power distribution equipment 1 which has been authenticated successfully by the authentication unit 34 are stored as the registered information in the storage unit 35. Note that the information stored in the storage unit 35 may be updated (as well as added or deleted) as appropriate.

The high-order system 3 includes, as a major constituent element, a computer system (e.g., a cloud computing system in this embodiment as an example) including one or more processors and one or more memories, for example. The computer system performs the functions of the high-order system 3 by making the one or more processors execute a program stored in the one or more memories. The program may be stored in advance in the memory. Alternatively, the program may also be distributed after having been stored in a non-transitory storage medium such as a memory card or downloaded via a telecommunications line. In other words, the program is designed to cause the one or more processors to serve as the high-order system 3.

Each appliance 2 includes an interface 21 (abbreviated as "I/F" in FIG. 3) and a functional unit 22. Although only one appliance 2 out of the plurality of appliances 2 is shown in FIG. 3, each of the other appliances 2 has the same configuration as the one shown in FIG. 3.

The interface 21 has the function of transmitting and receiving data to/from the power distribution equipment 1. In this embodiment, the interface 21 may be configured, for example, to be ready to communicate with the interface 15 of the power distribution equipment 1 by power line communication (PLC). The interface 21 enables controlling and monitoring the appliance 2 by transmitting and receiving data to/from the power distribution equipment 1.

The functional unit 22 has the basic function as the appliance 2. Specifically, if the appliance 2 is the TV receiver 201, the functional unit 22 has the function of the TV receiver. If the appliance 2 is the washing machine 203, the functional unit 22 has the function of the washing machine. If the appliance 2 is the lighting fixture 202, 204, 206, 208, or 210, the functional unit 22 has the function of a lighting fixture.

(2.4) Appliance Management Method

Next, an appliance management method according to this embodiment will be described with reference to FIG. 4.

Figure 4:
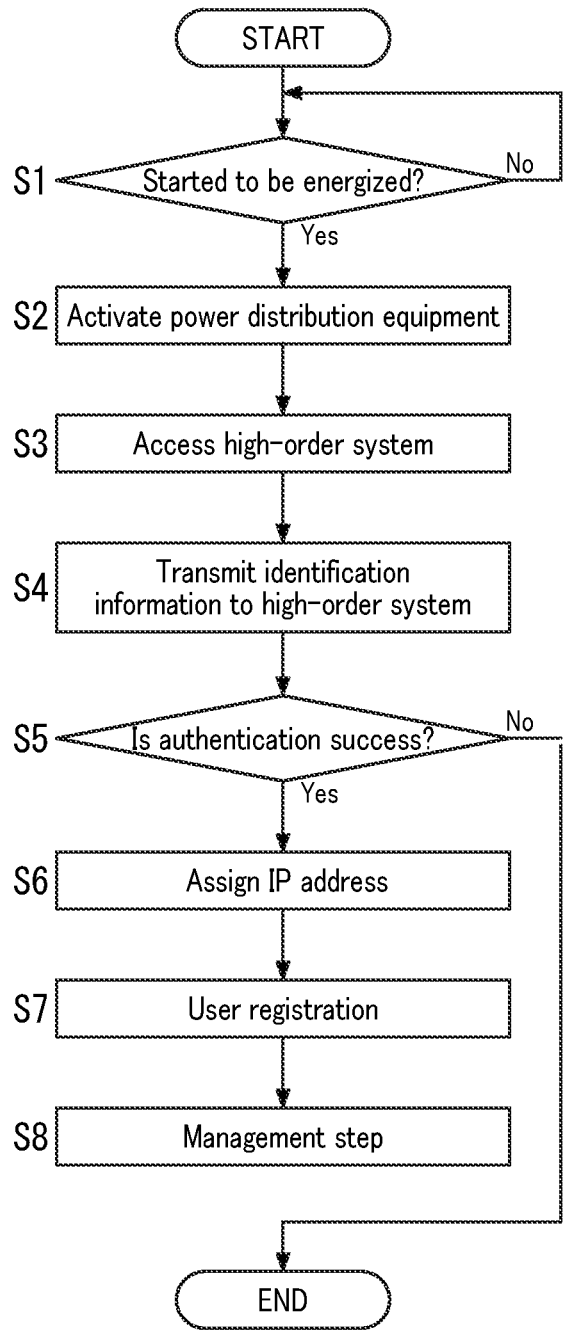
FIG. 4 is a flowchart showing an exemplary procedure of the appliance management method.

FIG. 4 is a flowchart showing an exemplary procedure of an appliance management method according to this embodiment. In this example, a network environment such as a Wi-Fi® network is supposed to have been established in advance in the facility F1 to which the power distribution equipment 1 is introduced. In addition, in this embodiment, each appliance 2 is supposed to be both controlled and monitored as the management of the appliance 2 as described above.

The appliance management method according to this embodiment includes, as a basic operation, making the power distribution equipment 1 perform the network management function to adapt the power distribution equipment 1 itself to a mesh network in response to start of energization of the power distribution equipment 1 as a trigger. In addition, when an appliance 2 is connected to the power distribution equipment 1, the power distribution equipment 1 performs the network management function to adapt a subordinate appliance 2 (i.e., the appliance 2 connected to the power distribution equipment 1 itself) to the mesh network. Furthermore, after the adaptation has been done, the power distribution equipment 1 rewrites the semantics of the distributed database included in the high-order system 3 to control and monitor the appliance 2.

Specifically, in the appliance management method according to this embodiment, unless the power distribution equipment 1 is energized (i.e., if the answer is NO in S1), the power distribution equipment 1 is not ready to exert its function of managing the appliance 2. When the power distribution equipment 1 starts to be energized (i.e., if the answer is YES in S1), the power distribution equipment 1 is activated (in S2).

When activated completely, the power distribution equipment 1 accesses the high-order system 3 (in S3). At this time, the power distribution equipment 1 is connected to the public network 41 via the router 42 and has its communications unit 11 communicate with the high-order system 3 via the public network 41. The power distribution equipment 1 that has accessed the high-order system 3 transmits identification information (e.g., an MAC address in this embodiment) to the high-order system 3 (in S4).

The high-order system 3 that has been accessed by the power distribution equipment 1 performs an authentication step of performing authentication on the power distribution equipment 1 (in S5). That is to say, making the power distribution equipment 1 access the high-order system 3 via the public network 41 after the power distribution equipment 1 has been energized allows the high-order system 3 to perform authentication on the power distribution equipment 1. In other words, when accessed by the power distribution equipment 1 via the public network 41 after the power distribution equipment 1 has been energized, the high-order system 3 performs authentication on the power distribution equipment 1.

When authentication of the power distribution equipment 1 is success (i.e., if the answer is YES in S5), the high-order system 3 makes the authentication unit 34 assign an IP address to the power distribution equipment 1 (in S6). Thereafter, the high-order system 3 performs user registration (in S7). Then, the management step of making the power distribution equipment 1 that has been authenticated in the authentication step control and/or monitor the appliance 2 (e.g., both control and monitor the appliance 2 in this embodiment) starts to be performed (in S8). The management step will be described in detail later in the "(2.5) Management step" section.

As used herein, if the authentication is "success," it means that the power distribution equipment 1 is recognized by the high-order system 3 as authentic power distribution equipment. In this embodiment, the identification information (e.g., MAC address) of the authentic power distribution equipment 1 is stored in advance in the storage unit 35 of the high-order system 3. Thus, the high-order system 3 collates the identification information transmitted from the power distribution equipment 1 with the identification information stored in the storage unit 35, thereby determining whether the authentication is success or not. That is to say, if the identification information transmitted from the power distribution equipment 1 agrees with the identification information stored in the storage unit 35, the authentication of this power distribution equipment 1 is success. On the other hand, if the former identification information does not agree with the latter, then the authentication is failure. Furthermore, the IP address assigned to the power distribution equipment 1 is stored in the storage unit 35 of the high-order system 3 in association with the identification information of the power distribution equipment 1 to which the IP address is assigned. Thus, the high-order system 3 manages the authenticated power distribution equipment 1 (i.e., the power distribution equipment 1 that has been authenticated successfully) with the IP address associated with its identification information.

On the other hand, if the authentication of the power distribution equipment 1 is failure (i.e., if the answer is NO in S5), then the high-order system 3 determines that this be an error to end the series of processing steps. That is to say, no IP address is assigned to the power distribution equipment 1 that has failed to be authenticated. Consequently, the IP address is assigned to only the power distribution equipment 1 that has been authenticated successfully. Note that the flowchart shown in FIG. 4 shows only an exemplary procedure of the appliance management method and any of these processing steps may be omitted as appropriate, an additional processing step may be performed as needed, or these processing steps may be performed in an appropriately modified order.

As can be seen from the foregoing description, the appliance management method according to this embodiment uses dynamic host configuration protocol (DHCP) service function on the high-order system 3 end to adapt the power distribution equipment 1 to the mesh network. The high-order system 3 stores in advance, in the storage unit 35, identification information (e.g., the MAC address in this embodiment) of the authentic power distribution equipment 1. When finding the identification information of the power distribution equipment 1 that has accessed the high-order system 3 authentic (i.e., when authenticating the power distribution equipment 1 successfully), the high-order system 3 assigns an IP address to the power distribution equipment 1.

In addition, not just the power distribution equipment 1 to be directly connected to the router 42 but also power distribution equipment 1 to be indirectly connected to the router 42 via another piece of power distribution equipment 1, the identification information is verified, and an IP address is assigned thereto in the same procedure as the above-described one. In that case, the power distribution equipment 1 interposed between the power distribution equipment 1 to be indirectly connected to the router 42 and the router 42 serves as a bridge.

The user registration to be performed after the IP address has been assigned is the processing of registering the user with respect to the power distribution equipment 1. The user-registered power distribution equipment 1 may be managed (i.e., controlled and monitored) with user ID as a piece of information to identify the user. That is to say, the user may manage the user-registered power distribution equipment 1 on the mobile communications device 51 such as a smartphone by entering user ID into the mobile communications device 51.

The user registration may be performed by the user with the mobile communications device 51 such as a smartphone, for example. Specifically, dedicated application software (program) has been installed in the mobile communications device 51. Starting the application software program on the mobile communications device 51 allows the mobile communications device 51 to access the high-order system 3. When the mobile communications device 51 accepts the user registration operation while accessing the high-order system 3, a user registration window is displayed on the mobile communications device 51. Entering the identification information or IP address of the power distribution equipment 1 and the user ID, for example, on this user registration window allows the user ID to be associated with the power distribution equipment 1. That is to say, the user ID that has been entered is stored in the storage unit 35 of the high-order system 3 in association with the identification information of the power distribution equipment 1. This allows the high-order system 3 to manage the authenticated power distribution equipment 1 with the user ID associated with its identification information, thus completing the user registration.

Optionally, at the time of the user registration, not only the user ID but also a password (or passcode) may be set. In that case, the password, as well as the user ID, is also stored in the storage unit 35 of the high-order system 3 in association with the identification information of the power distribution equipment 1. Setting the password requires verifying both the user ID and password entered into the mobile communications device 51 to manage the power distribution equipment 1 on the mobile communications device 51, which would enhance the degree of security.

Alternatively, the user registration may also be performed on the basis of an equipment group 100 (see FIG. 5) made up of multiple pieces of power distribution equipment 1. The user registration on an equipment group 100 basis will be described later in the "(2.6) Group control" section.

As can be seen from the foregoing description, the appliance management method according to this embodiment includes making the power distribution equipment 1 perform a control function and a network management function. The control function is the function of transmitting and receiving data in accordance with the semantics of a distributed database (high-order system 3). The network management function is the function of dynamically adapting a mesh network to the environment. Thus, this appliance management method allows the user to use the power distribution equipment 1 for managing the appliance 2 in the management step even without performing any special operation such as entering the name of the network or a password with respect to the power distribution equipment 1. Consequently, the appliance management method according to this embodiment achieves the advantage of facilitating lightening the workload on the user who is attempting to turn the appliance 2 into a manageable condition. In addition, there is no need, either, for a serviceman who is going to install the power distribution equipment 1 in the facility F1 to perform any special operation such as entering the name of the network or a password with respect to the power distribution equipment 1.

(2.5) Management Step

Next, the management step of the appliance management method according to this embodiment will be described in detail with reference to FIG. 2.

In the following description, the authentication in the authentication step and the user registration are supposed to have already been done with respect to every power distribution equipment 1 installed in the facility F1.

First, a scene on which the power distribution equipment 1 (e.g., a wiring device serving as an outlet in FIG. 2) monitors an appliance 2 (e.g., a TV receiver in FIG. 2) will be described.

The management step includes acquiring measuring information about the appliance 2 by making the power distribution equipment 1 monitor the appliance 2. The measuring information includes at least one of: electric energy information about the electric energy to be consumed by the appliance 2; operation information about the operation of the appliance 2; or environmental information measured by the appliance 2 about an environment surrounding the appliance 2.

As used herein, the "electric energy information" includes information in general about the electric energy consumed by the appliance 2. Examples of the electric energy information include an instantaneous value of the consumed electric energy, the electric energy consumed by the appliance 2 in a given time slot of the day, and the value of an electric current or voltage supplied to the appliance 2. Alternatively, examples of the electric energy information may also include the waveform of the consumed electric energy, the waveform of the electric current, and the waveform of the voltage. Also, attribute information about the attribute of the appliance 2 such as the type of the appliance 2 (which may be a TV receiver, an air conditioner, or a lighting fixture, for example), the model of the appliance 2, or the characteristics of the appliance 2 may be estimated based on the waveform of the consumed electric energy, the waveform of the electric current, or the waveform of the voltage. Therefore, the electric energy information includes the attribute information about the appliance 2. Such electric energy information may be acquired by the power distribution equipment 1 by having a sensor (such as a current sensor) provided for the power distribution equipment 1 make measurement. Alternatively, the electric energy information may also be acquired by the power distribution equipment 1 from the appliance 2 via communication with the appliance 2.

Also, the "operation information" as used herein includes information in general about the operation of the appliance 2. The operation information includes, for example, information about the ON/OFF states (i.e., energized and deenergized states) and the operation mode of the appliance 2. More specifically, if the appliance 2 is the TV receiver 201, the operation information includes, for example, information about the channel for viewing and volume of the TV receiver 201. If the appliance 2 is the air conditioner 209, the operation information includes, for example, information about the temperature setting, the timer setting state, the air direction, and the air volume. If the appliance 2 is a video recorder and player, the operation information includes, for example, information about the programs scheduled for recording and the recorded programs. If the appliance 2 is a washing machine, the operation information includes, for example, information about the amount of detergent required, the modes such as washing, rinsing, dewatering, and drying modes, and operating durations in the respective modes. If the appliance 2 is a refrigerator, the operation information includes, for example, information about the temperature inside, settings for the respective compartments, and the time required for making ice. If the appliance 2 is a packaged air conditioner (air-conditioning equipment), the operation information includes, for example, information about the operating hours, the cumulative operating hours, filter used hours (which is the time that has passed since the filter was reset), and temperature or humidity sensor information. If the appliance 2 is a copy machine, the operation information includes, for example, information about operating hours, the quantity of residual toner, the number of paper sheets used, and the number of paper sheets remaining Optionally, the operation information may further include, with respect to the appliance 2, the operation log or error information to be provided for the user, and the operation log or error information to be provided for a serviceman. These pieces of operation information may be acquired by the power distribution equipment 1 from the appliance 2 via communication with the appliance 2, for example.

Furthermore, the "environmental information" as used herein includes information in general that has been measured by the appliance 2 about the environment surrounding the appliance 2. Examples of the environmental information include information about various physical quantities such as temperature (room temperature), humidity, illuminance, atmospheric pressure, velocity, acceleration, angular velocity, angular acceleration, sound, and odor. The environmental information may further include information about, for example, the presence or absence of any person in the space surrounding the appliance 2, the ultraviolet radiation dose, the infrared radiation dose, or the received radio wave strength. These pieces of environmental information are acquired, based on the results of measurement obtained by the sensor (such as a temperature sensor) provided for the appliance 2, for example, by the power distribution equipment 1 from the appliance 2 via communication with the appliance 2.

In the management step, the power distribution equipment 1 acquires these pieces of measuring information at regular or irregular intervals (i.e., as needed). Then, the measuring information acquired by the power distribution equipment 1 is transmitted as appropriate to the high-order system 3 via the public network 41. This allows the user to check out, as appropriate, the measuring information about the appliance 2 installed in the facility F1 by sending inquiry to the high-order system 3 using either the mobile communications device 51 or the operating device 52, for example.

Furthermore, the measuring information that has been obtained about the appliance 2 by making the power distribution equipment 1 monitor the appliance 2 in the management step is collected by the high-order system 3 from one or more pieces of power distribution equipment 1 and aggregated in a single place (i.e., the high-order system 3). That is to say, the multiple pieces of measuring information acquired by the multiple pieces of power distribution equipment 1 are aggregated in the high-order system 3 by the telemetric function of the high-order system 3. In other words, the appliance management method according to this embodiment further includes a telemetry step. The telemetry step includes making the high-order system 3 collect, from one or more pieces of the power distribution equipment 1, measuring information that has been obtained about the appliance 2 by making the power distribution equipment 1 monitor the appliance 2 in the management step. The telemetry step will be described in detail later in the "(2.7) Telemetric function" section.

In this embodiment, starting the dedicated application software on either the mobile communications device 51 or the operating device 52, for example, causes either the mobile communications device 51 or the operating device 52 to access the high-order system 3. Letting the user enter the user ID and password on either the mobile communications device 51 or the operating device 52 in this state turns the appliance 2 associated with the user into a monitorable condition. Specifically, this makes either the mobile communications device 51 or the operating device 52 ready to accept the input of a monitoring command for monitoring the appliance 2. In a situation where a plurality of appliances 2 are associated with a single user, the monitoring command includes information for designating (i.e., selecting) an appliance 2 to monitor among the plurality of appliances 2.

Consequently, this allows the user who is currently outside of the facility F1, for example, to check out information about the electric energy consumed by an appliance 2 in the facility F1 (i.e., the electric energy information) using either the mobile communications device 51 or the operating device 52. In the same way, this also allows the user who is currently outside of the facility F1, for example, to check out information about the operation of an appliance 2 in the facility F1 (i.e., the operation information) and information measured by the appliance 2 about the environment surrounding the appliance 2 (i.e., the environmental information) using either the mobile communications device 51 or the operating device 52. Therefore, the user is allowed to monitor the appliance 2 remotely.

Next, a scene on which the power distribution equipment 1 (e.g., a wiring device serving as an outlet in FIG. 2) controls an appliance 2 (e.g., a TV receiver in FIG. 2) will be described.

The management step includes transmitting data from the power distribution equipment 1 toward a power supply destination. As used herein, the "power supply destination" means a destination to which power is supplied as viewed from the power distribution equipment 1, i.e., a downstream end of the power supply channel. Specifically, the power supply destinations for the power distribution equipment 1 implemented as the distribution board 101 includes the plurality of wiring devices 102-112 and the plurality of appliances 2 to be connected to the plurality of wiring devices 102-112. On the other hand, for the multiple pieces of power distribution equipment 1 implemented as the wiring devices 102-112, the power supply destinations include the appliances 2 to be connected to the respective wiring devices 102-112. In this embodiment, the interface 15 of the power distribution equipment 1 is ready to communicate via the power line communication (PLC), for example. Thus, data may be transmitted toward either the power distribution equipment 1 or an appliance 2 as the power supply destination which is connected to the power distribution equipment 1 through the power supply channel (power line).

In this case, the management step includes controlling an appliance 2 in accordance with the data transmitted from the power distribution equipment 1 to the appliance 2. That is to say, the appliance 2 is controlled in accordance with the data transmitted from the power distribution equipment 1. Thus, transmitting data from the power distribution equipment 1 to the power supply destination as described above enables controlling the appliance 2 connected to the power distribution equipment 1.

For example, if the appliance 2 is the TV receiver 201, the ON/OFF states (i.e., energized and deenergized states), channel, volume, and other parameters of the TV receiver 201 may be controlled in accordance with the data transmitted from the power distribution equipment 1 to the appliance 2. If the appliance 2 is the air conditioner 209, the temperature setting, the timer setting state, the air direction, the air volume, and other parameters may be controlled in accordance with the data transmitted from the power distribution equipment 1 to the appliance 2. If the appliance 2 is a video recorder and player, arranging the schedule for recording programs and playing back the recorded programs, for example, may be controlled in accordance with the data transmitted from the power distribution equipment 1 to the appliance 2. If the appliance 2 is a washing machine, the amount of detergent introduced, the modes such as washing, rinsing, dewatering, and drying modes, and operating durations in the respective modes, for example, may be controlled in accordance with the data transmitted from the power distribution equipment 1 to the appliance 2.

Furthermore, the power distribution equipment 1 may also control any appliance 2, for example, in accordance with the measuring information that has been obtained about the appliance 2 by making the power distribution equipment 1 monitor the appliance 2 in the management step. This enables controlling a plurality of appliances 2 synchronously with each other. For example, if the TV receiver 201 and the lighting fixture 202 need to be controlled in synch with each other, a control operation such as adjusting the brightness of the lighting fixture 202 according to the channel for viewing on the TV receiver 201 may be performed. In another example, if the air conditioner 209 and the lighting fixture 210 need to be controlled in synch with each other, a control operation such as adjusting the lighting color of the lighting fixture 210 in accordance with the information provided by the temperature sensor or humidity sensor of the air conditioner 209 may be performed. This enables even a function that is not introduced into the appliance 2 itself to be performed by the control operation using the power distribution equipment 1.

The appliance management method according to this embodiment further includes a remote-control step. The remote-control step includes transmitting a control instruction from the high-order system 3 to the power distribution equipment 1. The control instruction instructs the power distribution equipment 1 to control the appliance 2 in the management step. That is to say, the control instruction instructing that the appliance 2 be controlled is transmitted as appropriate from the high-order system 3 to the power distribution equipment 1 via the public network 41. This allows the user to control any appliance 2 installed in the facility F1 by sending inquiry to the high-order system 3 using either the mobile communications device 51 or the operating device 52, for example.

In this embodiment, starting the dedicated application software on either the mobile communications device 51 or the operating device 52, for example, causes either the mobile communications device 51 or the operating device 52 to access the high-order system 3. Letting the user enter the user ID and password on either the mobile communications device 51 or the operating device 52 in this state turns the appliance 2 associated with the user into a controllable condition. Specifically, this makes either the mobile communications device 51 or the operating device 52 ready to accept the input of a control command for controlling the appliance 2. In a situation where a plurality of appliances 2 are associated with a single user, the control command includes information for designating (i.e., selecting) an appliance 2 to control among the plurality of appliances 2. The high-order system 3 generates a control instruction in accordance with the control command thus input and transmits the control instruction to the power distribution equipment 1.

Consequently, this allows the user who is currently outside of the facility F1, for example, to control any appliance 2 in the facility F1 using either the mobile communications device 51 or the operating device 52. Therefore, the user is allowed to control the appliance 2 remotely.

As can be seen from the foregoing description, the appliance management method according to this embodiment enables, if the power distribution equipment 1 is connected to the high-order system 3 (cloud computing system), the appliance 2 to be monitored and controlled remotely by making the power distribution equipment 1 communicate with the high-order system 3. In addition, this also enables, even if the connection (communication) between the power distribution equipment 1 and the high-order system 3 is cut off, the power distribution equipment 1 to serve as the agent of monitoring and controlling the appliance 2. That is to say, the function of managing (i.e., controlling and monitoring) the appliance 2 is completed on the side of the edge including the power distribution equipment 1, thus enabling monitoring and controlling the appliance 2 in the facility F1 with more reliability.

(2.6) Group Control

Next, an equipment group 100 made up of multiple pieces of power distribution equipment 1 will be described with reference to FIG. 5.

Figure 5:
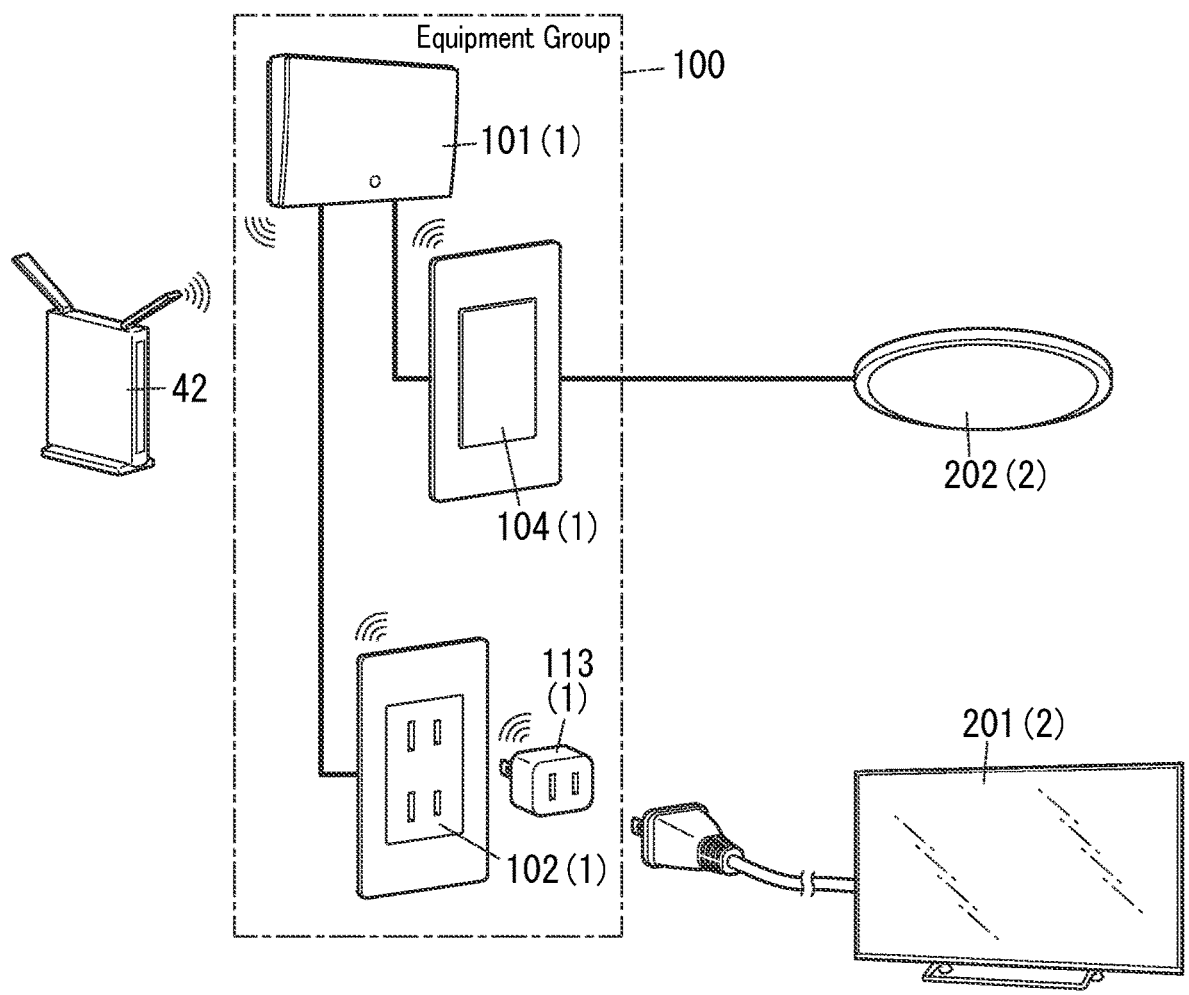
FIG. 5 is a schematic representation illustrating an exemplary group of equipment according to the appliance management method.

As shown in FIG. 5, multiple pieces of power distribution equipment 1 together form the equipment group 100. In other words, the equipment group 100 includes the multiple pieces of power distribution equipment 1. In FIG. 5, four pieces in total of power distribution equipment 1, namely, a distribution board 101, a wiring device 102 serving as an outlet, a wiring device 104 serving as a switch, and a plug 113, are illustrated as exemplary constituent members that form the equipment group 100. Actually, however, an even larger number of pieces of power distribution equipment 1 are included in the equipment group 100. For example, the multiple pieces of the power distribution equipment 1 installed in the same facility F1 are all included in the single equipment group 100.

The plug 113 is an adapter which is connectible to the wiring device 102 serving as an outlet and to which the plug of an appliance 2 is connectible. That is to say, the plug 113 is used to be interposed between the wiring device 102 serving as an outlet and the plug of the appliance 2. In other words, the plug of the appliance 2 is electrically connected to the wiring device 102 via the plug 113.

The multiple pieces of power distribution equipment 1 belonging to the same equipment group 100 are given, for example, the same group ID. Specifically, the group ID is stored in advance, along with the identification information (e.g., MAC address) of the authentic power distribution equipment 1, in the storage unit 35 of the high-order system 3. Basically, multiple pieces of power distribution equipment 1 given the same group ID are sold as a set. That is to say, using such multiple pieces of power distribution equipment 1 that are sold as a set as the multiple pieces of power distribution equipment 1 to be introduced into the same facility F1 allows the multiple pieces of power distribution equipment 1 given the same group ID to be installed in the same facility F1.

Furthermore, the user registration may also be performed on an equipment group 100 basis as described above. That is to say, entering, on the user registration window, the group ID, instead of the identification information or IP address of the power distribution equipment 1, for example, in association with the user ID allows the user ID to be associated with the equipment group 100 having this group ID. In other words, the user ID that has been entered is stored, in association with the group ID of the equipment group 100, in the storage unit 35 of the high-order system 3. This allows the high-order system 3 to manage the multiple pieces of authenticated power distribution equipment 1 such that the user ID is associated with the multiple pieces of power distribution equipment 1 on an equipment group 100 basis, thus completing the user registration.

As can be seen, multiple pieces of power distribution equipment 1 that form the equipment group 100 have the same function. In addition, since the user registration is made on the equipment group 100 basis, the multiple pieces of power distribution equipment 1 may be managed collectively with a single user ID. Specifically, the lighting fixture 202 connected to the wiring device 104 serving as a switch may be controlled or monitored in the same way by any of the wiring device 104 or the distribution board 101 to which the wiring device 104 is connected, whichever is taken. Likewise, the TV receiver 201 connected, via the plug 113, to the wiring device 102 serving as an outlet may also be controlled or monitored in the same way by any of the wiring device 102, the plug 113, or the distribution board 101 to which the wiring device 102 is connected, whichever is taken.

As can be seen from the foregoing description, in the appliance management method according to this embodiment, the power distribution equipment 1 to be subject to authentication in the authentication step includes the outlet (wiring device 102) and the plug 113. In the management step, the authenticated outlet (wiring device 102) and the plug 113 each control and/or monitor the appliance 2. This allows the TV receiver 201 to be adaptively controlled and monitored, for example, by the plug 113 normally and by the outlet (wiring device 102) when the plug 113 is out of working order, depending on the situation.

(2.7) Telemetric Function

Next, the telemetry step in which the high-order system 3 collects measuring information from one or more pieces of power distribution equipment 1 will be described with reference to FIG. 6.

Figure 6:
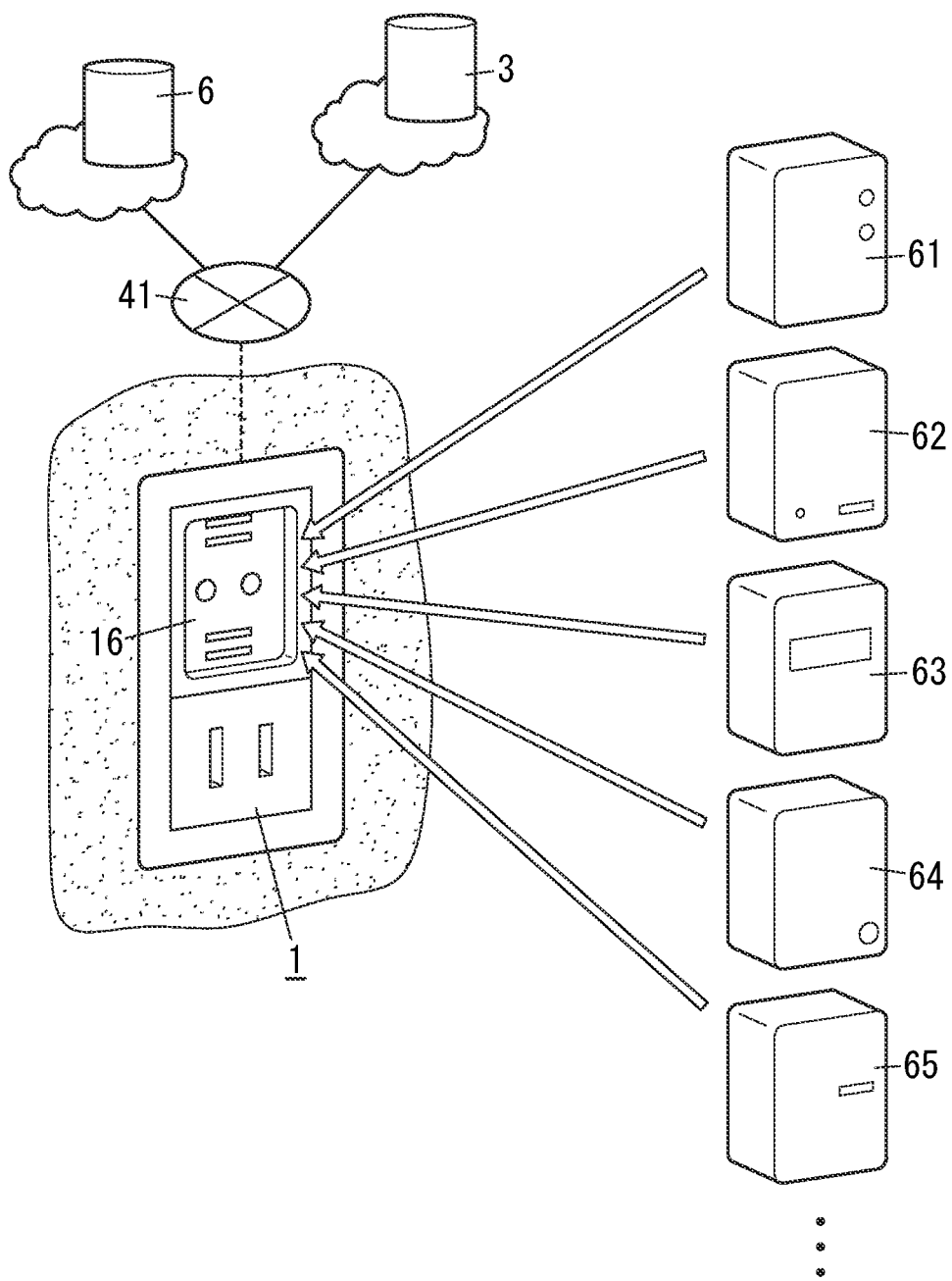
FIG. 6 is a schematic representation illustrating an exemplary sensor system according to the appliance management method.

As shown in FIG. 6, a sensor system 6 is connected to the public network 41. The sensor system 6 is a system for managing the environmental information that has been measured by sensors 61-65 serving as exemplary appliances 2. The sensor system 6 accumulates, as big data, for example, many pieces of environmental information that have been collected by the high-order system 3.

In the example illustrated in FIG. 6, any one of various types of sensors 61-65 may be attached to the power distribution equipment 1 (e.g., a wiring device serving as an outlet in this example). The sensors 61-65 are various types of sensors such as a temperature sensor, a humidity sensor, an illuminance sensor, a (barometric) pressure sensor, an acceleration sensor, a vibration sensor, a sound sensor, and an odor sensor. Specifically, these sensors 61-65 each have the housing of the same shape and are each removably attached to an attachment portion 16 of the power distribution equipment 1. In this example, a magnet, for example, is disposed in the attachment portion 16 to allow the power distribution equipment 1 to hold any one of these sensors 61-65 with the magnetic force of the magnet. In addition, the attachment portion 16 is preferably configured to supply power to each of these sensors 61-65 as appliances 2 by a contactless feeding method. Such a configuration enables providing the function of any one of the sensors 61-65 for the power distribution equipment 1 according to the intended use.

As can be seen, in the appliance management method according to this embodiment, the environmental information includes information about the physical quantity detected by any of the sensors 61-65 provided as an exemplary appliance 2 for the power distribution equipment 1. In this case, none of these sensors 61-65 has to be removably attached to the power distribution equipment 1 as in the example shown in FIG. 6. Alternatively, any of these sensors 61-65 may form an inseparable part of the housing of the power distribution equipment 1, for example. Still alternatively, any of these sensors 61-65 may also be built in the housing of the power distribution equipment 1.

(3) Variations

Note that the first embodiment described above is only an exemplary one of various embodiments of the present disclosure and should not be construed as limiting. Rather, the first exemplary embodiment may be readily modified in various manners depending on a design choice or any other factor without departing from the scope of the present disclosure. Also, the drawings to be referred to in the description of embodiments are schematic representations.

That is to say, the ratio of the dimensions (including thicknesses) of respective constituent elements illustrated on the drawings does not always reflect their actual dimensional ratio. Furthermore, the functions of the appliance management method according to the first embodiment may also be implemented as an appliance management system 10, a computer program, or a non-transitory storage medium that stores a computer program thereon.

Next, variations of the first exemplary embodiment will be enumerated one after another. Note that the variations to be described below may also be adopted in combination as appropriate.

The appliance management system 10 according to the present disclosure includes a computer system. The computer system may include, as principal hardware components, a processor and a memory. The functions of the appliance management system 10 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, at least some functions of the appliance management system 10 are integrated together in a single housing. However, this is not an essential configuration for the appliance management system 10. Alternatively, those constituent elements of the appliance management system 10 may be distributed in multiple different housings. Still alternatively, at least some functions, provided for the power distribution equipment 1, of the appliance management system 10 may be provided in a different housing from the power distribution equipment 1. Yet alternatively, at least some functions of the power distribution equipment 1 may also be implemented as, for example, a cloud computing system as well.

Conversely, at least some functions distributed in multiple devices in the first embodiment may be aggregated together in a single housing. For example, the functions distributed in the power distribution equipment 1 and the high-order system 3 may be aggregated together in a single housing.

Also, the appliance management method does not have to be used in a single-family dwelling house. Alternatively, the appliance management method is also applicable for use in a dwelling facility other than a single-family dwelling house or in a non-dwelling facility. For example, this appliance management method is also applicable for use in non-dwelling facilities such as stores (tenants), offices, welfare facilities, educational institutions, hospitals, and factories.

Furthermore, in the first embodiment described above, an OpenSync™ module manufactured by Plume Design, Inc., is installed in the power distribution equipment 1. However, it is not essential for the appliance management method to use the OpenSync™ module. Likewise, it is not essential for the appliance management method, either, to use MQTT as the telemetric function or to use OVSDB™ as a distributed database, for example.

Furthermore, the authentication step only needs to include allowing the high-order system 3 to perform authentication on the power distribution equipment 1 by making the power distribution equipment 1 access the high-order system 3 via the public network 41 after the power distribution equipment 1 has been energized. That is to say, it is not essential for the appliance management method to make the power distribution equipment 1 access the high-order system 3 as soon as the power distribution equipment 1 has been energized. Alternatively, it is not until the user performs a particular operation after the power distribution equipment 1 has been energized that the power distribution equipment 1 may access the high-order system 3.

Furthermore, the communication protocol adopted by the power distribution equipment 1 only needs to be either a protocol selected from the group consisting of a wireless multi-hop, Wi-Fi®, Bluetooth®, ZigBee®, Ethernet®, power line communication (PLC), and Power over Ethernet (PoE)®, or a combination thereof. That is to say, the communication protocol adopted in the first embodiment described above is only an example and should not be construed as limiting. For example, the communication protocol adopted by the communications unit 11 may also be a wireless communication protocol other than the tri-band Wi-Fi® or may even be a wired communication protocol. Furthermore, the communication protocol adopted by the interface 15 may be a communication protocol other than the power line communication (PLC) and may also be, for example, a wireless communication protocol such as the Wi-Fi®. Furthermore, the communication protocol adopted by the power distribution equipment 1 may also be a communication protocol that uses a cellular phone network such as the third generation (3G) network, the long-term evolution (LTE) network, the fourth generation network (4G), or the fifth generation network (5G).

Furthermore, the attachment portion 16 does not have to employ the contactless feeding method but may also include, for example, a contact terminal and be configured to supply power from the terminal to any of the sensors 61-65 as exemplary appliances 2.

Second Embodiment

Figure 7:
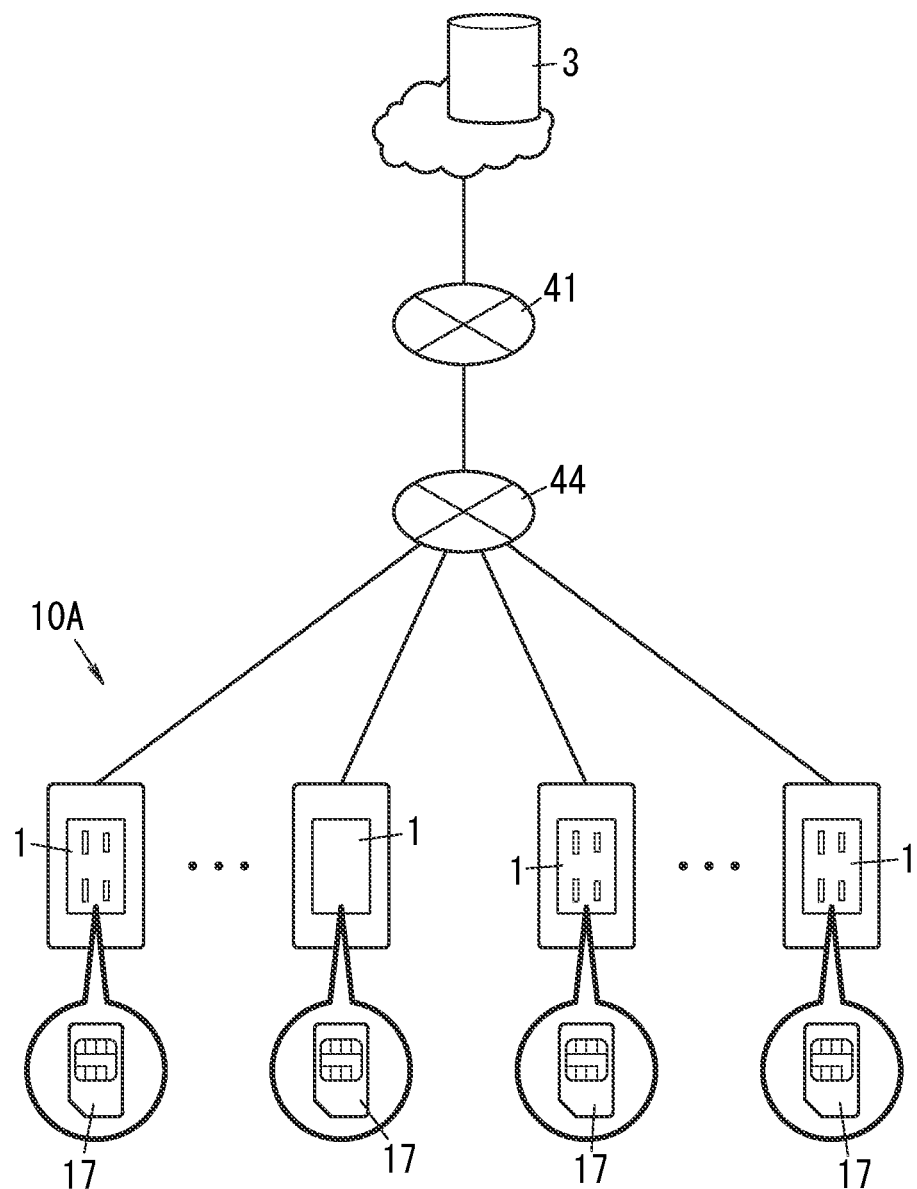
FIG. 7 illustrates a schematic configuration for an appliance management system according to a second embodiment.

An appliance management method according to a second embodiment is performed by an appliance management system 10A in which the power distribution equipment 1 is connected to the public network 41 in a different manner as shown in FIG. 7, which is a major difference from the appliance management method according to the first embodiment. In the following description, any constituent element of this second embodiment, having the same function as a counterpart of the first embodiment described above, will be designated by the same reference numeral as that counterpart's, and description thereof will be omitted herein as appropriate.

Specifically, in the appliance management system 10A according to this embodiment, each piece of power distribution equipment 1 is connected to the public network 41 via a cellular phone network 44 provided by a communication service provider. Thus, the power distribution equipment 1 includes a subscriber identity module (SIM) 17. As used herein, the "SIM" may be removably attached to the power distribution equipment 1 as in a SIM card or may also be inseparably built in the power distribution equipment 1 as in an e-SIM. To the SIM, unique identification information (i.e., a phone number) is assigned in advance. Examples of the cellular phone network 44 include the third generation (3G) network, the long-term evolution (LTE) network, the fourth generation network (4G), and the fifth generation network (5G).

The appliance management method according to this embodiment enables performing authentication on the power distribution equipment 1 using the identification information (i.e., phone number) unique to the SIM instead of the identification information such as the MAC address. That is to say, in this embodiment, the identification information (phone number) of the authentic power distribution equipment 1 is stored in advance in the storage unit 35 of the high-order system 3. Thus, the high-order system 3 determines, by collating the identification information transmitted from the power distribution equipment 1 with the identification information stored in the storage unit 35, whether the authentication is success or not.

Specifically, when activated completely after having started to be energized, the power distribution equipment 1 accesses the high-order system 3. At this time, the power distribution equipment 1 is connected to the public network 41 via the cellular phone network 44 and makes the communications unit 11 communicate with the high-order system 3 via the public network 41. The power distribution equipment 1 that has accessed the high-order system 3 transmits the identification information (e.g., phone number in this embodiment) to the high-order system 3.

When accessed by the power distribution equipment 1, the high-order system 3 performs the authentication step of performing authentication on the power distribution equipment 1. That is to say, making the power distribution equipment 1 access the high-order system 3 via the public network 41 after the power distribution equipment 1 has been energized allows the high-order system 3 to perform authentication on the power distribution equipment 1. In other words, when accessed by the power distribution equipment 1 via the public network 41 after the power distribution equipment 1 has been energized, the high-order system 3 performs authentication on the power distribution equipment 1.

If the power distribution equipment 1 is authenticated successfully, the high-order system 3 makes the authentication unit 34 assign an IP address to the power distribution equipment 1. The IP address assigned to the power distribution equipment 1 is stored in the storage unit 35 of the high-order system 3 in association with the identification information (phone number) of the power distribution equipment 1 to which the IP address is assigned. This allows the high-order system 3 to manage the authenticated power distribution equipment 1 (i.e., the power distribution equipment 1 that has been authenticated successfully) with the IP address associated with its identification information.

The appliance management method according to this embodiment enables, even if no network environment such as the Wi-Fi® network is established in the facility F1, performing authentication on the power distribution equipment 1 by having the power distribution equipment 1 connected to the public network 41 via the cellular phone network 44.

According to one variation of the second embodiment, the power distribution equipment 1 may also be subjected to authentication by, for example, home location register (HLR) or home subscriber server (HSS).

According to another variation, international mobile subscriber identity (IMSI) may also be used as the identification information of the power distribution equipment 1 instead of the phone number.

Note that the various configurations (including variations) described for the second embodiment may be adopted as appropriate in combination with the various configurations (including variations) described for the first embodiment.

(Recapitulation)

As can be seen from the foregoing description, an appliance management method according to a first aspect is designed to make power distribution equipment (1), provided on a power supply channel, control and/or monitor an appliance (2) to be electrically connected to the power distribution equipment (1). The appliance management method includes an authentication step and a management step. The authentication step includes allowing a high-order system (3) to perform authentication on the power distribution equipment (1) by making the power distribution equipment (1) access the high-order system (3) via a public network (41) after the power distribution equipment (1) has been energized. The management step includes making the power distribution equipment (1) that has been authenticated in the authentication step control and/or monitor the appliance (2).

According to this aspect, the management of the appliance (2) is made by the power distribution equipment (1), and therefore, communication settings and other procedures with respect to the appliance (2) may be performed on a power distribution equipment (1) basis. This makes it easier to lighten the workload on the user about the update of the communication settings and other procedures, compared to a situation where the communication settings need to be updated and other troublesome procedures need to be followed all over again, every time an appliance (2) is newly introduced into the network (as in a situation where the communication settings and other procedures are performed on an appliance (2) basis). In addition, the power distribution equipment (1) that has been authenticated in the authentication step may be used to make management of the appliance (2) in the management step, thus lightening the workload on the user in the authentication step as well. That is to say, the authentication step includes allowing the high-order system (3) to perform authentication on the power distribution equipment (1) by making the power distribution equipment (1) access the high-order system (3) via a public network (41) after the power distribution equipment (1) has been energized. Thus, no special operation needs to be performed on the power distribution equipment (1). This allows the user to use the power distribution equipment (1) to manage the appliance (2) in the management step even without performing any special operation such as entering the name of the network or a password with respect to the power distribution equipment (1). Consequently, this appliance management method achieves the advantage of facilitating lightening the workload on the user who is attempting to turn the appliance (2) into a manageable condition.

An appliance management method according to a second aspect, which may be implemented in conjunction with the first aspect, further includes a telemetry step. The telemetry step includes making the high-order system (3) collect, from one or more pieces of the power distribution equipment (1), measuring information that has been obtained about the appliance (2) by making the power distribution equipment (1) monitor the appliance (2) in the management step.

This aspect makes it easier to lighten the workload on the user who is attempting to perform the telemetric function.

In an appliance management method according to a third aspect, which may be implemented in conjunction with the second aspect, the measuring information includes at least one of: electric energy information about electric energy to be consumed by the appliance (2); operation information about operation of the appliance (2); or environmental information measured by the appliance (2) about an environment surrounding the appliance (2).

This aspect enables collecting various types of information about the appliance (2) as measuring information.

In an appliance management method according to a fourth aspect, which may be implemented in conjunction with the third aspect, the environmental information includes information about a physical quantity detected by a sensor (61-65) provided as the appliance (2) for the power distribution equipment (1).

This aspect allows the sensor (61-65) provided for the power distribution equipment (1) to acquire any of various types of environmental information.

In an appliance management method according to a fifth aspect, which may be implemented in conjunction with any one of the first to fourth aspects, the management step includes transmitting data from the power distribution equipment (1) toward a destination to which electric power is supplied from the power distribution equipment (1).

This aspect enables outputting various types of information from the power distribution equipment (1) to the destination to which electric power is supplied.

In an appliance management method according to a sixth aspect, which may be implemented in conjunction with the fifth aspect, the management step includes controlling the appliance (2) in accordance with the data transmitted from the power distribution equipment (1) to the appliance (2).

This aspect enables controlling the appliance (2) in accordance with the data provided by the power distribution equipment (1).

In an appliance management method according to a seventh aspect, which may be implemented in conjunction with any one of the first to sixth aspects, a communication protocol adopted by the power distribution equipment (1) is either a protocol selected from the following group of communication protocols or a combination thereof. The group of communication protocols consists of a wireless multi-hop, Wi-Fi®, Bluetooth®, ZigBee®, Ethernet®, power line communication, and Power over Ethernet®.

This aspect allows the user to employ an appropriate communication protocol according to the situation.

In an appliance management method according to an eighth aspect, which may be implemented in conjunction with any one of the first to seventh aspects, the power distribution equipment (1) to be subjected to the authentication in the authentication step includes an outlet and a plug (113). The management step includes making each of the outlet and the plug (113) that have been authenticated control and/or monitor the appliance (2).

This aspect allows each of the outlet and the plug (113) to control or monitor the appliance (2).

An appliance management method according to a ninth aspect, which may be implemented in conjunction with any one of the first to eighth aspects, includes making the power distribution equipment (1) perform: a control function of transmitting and receiving data in accordance with semantics of a distributed database; and a network management function of dynamically adapting a mesh network to an environment.

This aspect enables dynamically adapting a mesh network to the environment.

An appliance management method according to a tenth aspect, which may be implemented in conjunction with any one of the first to ninth aspects, further includes a remote-control step. The remote-control step includes transmitting a control instruction from the high-order system (3) to the power distribution equipment (1). The control instruction instructs the power distribution equipment (1) to control the appliance (2) in the management step.

This aspect enables remote-controlling the appliance (2) by way of the high-order system (3).

A program according to an eleventh aspect is designed to cause one or more processors to perform the appliance management method according to any one of the first to tenth aspects.

This aspect achieves the advantage of facilitating lightening the workload on the user who is attempting to turn the appliance (2) into a manageable condition.

Power distribution equipment (1) according to a twelfth aspect is applicable as the power distribution equipment (1) to the appliance management method according to any one of the first to tenth aspects.

This aspect achieves the advantage of facilitating lightening the workload on the user who is attempting to turn the appliance (2) into a manageable condition.

An appliance management system (10, 10A) according to a thirteenth aspect includes: power distribution equipment (1) provided on a power supply channel; and a high-order system (3). The high-order system (3) performs authentication on the power distribution equipment (1) when accessed by the power distribution equipment (1) via a public network (41) after the power distribution equipment (1) has been energized. The power distribution equipment (1) that has been authenticated by the high-order system (3) controls and/or monitors the appliance (2) to be electrically connected to the power distribution equipment (1).

This aspect achieves the advantage of facilitating lightening the workload on the user who is attempting to turn the appliance (2) into a manageable condition.

Note that these are not the only aspects of the present disclosure. Rather, various features (including variations) of the appliance management method according to the first and second exemplary embodiments described above may also be implemented as a program, power distribution equipment (1), or an appliance management system (10, 10A).

Note that the features according to the second to tenth aspects are not essential features for the appliance management method but may be omitted as appropriate.

REFERENCE SIGNS LIST

1 Power Distribution Equipment
2 Appliance
3 High-Order System 10, 10A Appliance Management System
41 Public Network
61-65 Sensor
113 Plug

The invention claimed is:

1. An appliance management method for making power distribution equipment, provided on a power supply channel, control and/or monitor an appliance to be electrically connected to the power distribution equipment, the appliance management method comprising:
an authentication step including:
allowing a high-order system to perform authentication on the power distribution equipment by making the power distribution equipment access the high-order system via a public network after the power distribution equipment has been energized;
comparing identification information transmitted from the power distribution equipment to the high-order system with identification information stored in a storage unit of the high-order system; and
storing, if the identification information transmitted from the power distribution equipment to the high-order system agrees with the identification information stored in the storage unit, an address, assigned to the power distribution equipment, in the storage unit in association with the identification information of the power distribution equipment to which the address is assigned;
a management step including making the power distribution equipment that has been authenticated in the authentication step control and/or monitor the appliance; and
a telemetry step including making the high-order system collect, from one or more pieces of the power distribution equipment, measuring information that has been obtained about the appliance by making the power distribution equipment monitor the appliance in the management step.

2. The appliance management method of claim 1, wherein the measuring information includes at least one of: electric energy information about electric energy to be consumed by the appliance; operation information about operation of the appliance; or environmental information measured by the appliance about an environment surrounding the appliance.

3. The appliance management method of claim 2, wherein the environmental information includes information about a physical quantity detected by a sensor provided as the appliance for the power distribution equipment.

4. The appliance management method of claim 1, wherein the management step includes transmitting data from the power distribution equipment toward a destination to which electric power is supplied from the power distribution equipment.

5. The appliance management method of claim 4, wherein the management step includes controlling the appliance in accordance with the data transmitted from the power distribution equipment to the appliance.

6. The appliance management method of claim 1, wherein a communication protocol adopted by the power distribution equipment is either a protocol selected from the group consisting of a wireless multi-hop, Wi-Fi®, Bluetooth®, ZigBee®, Ethernet®, power line communication, and Power over Ethernet®, or a combination thereof.

7. The appliance management method of claim 1, wherein the power distribution equipment to be subjected to the authentication in the authentication step includes an outlet and a plug, and
the management step includes making each of the outlet and the plug that have been authenticated control and/or monitor the appliance.

8. The appliance management method of claim 1, comprising making the power distribution equipment perform:
a control function of transmitting and receiving data in accordance with semantics of a distributed database; and
a network management function of dynamically adapting a mesh network to an environment.

9. The appliance management method of claim 1, further comprising a remote-control step including transmitting a control instruction from the high-order system to the power distribution equipment, the control instruction instructing the power distribution equipment to control the appliance in the management step.

10. A non-transitory storage medium readable for a computer system and storing a program designed to cause one or more processors of the computer system to perform the appliance management method of claim 1.

11. Power distribution equipment applicable as the power distribution equipment to the appliance management method of claim 1.

12. An appliance management system comprising:
power distribution equipment provided on a power supply channel; and
a high-order system, wherein:
the high-order system is configured to perform authentication on the power distribution equipment when accessed by the power distribution equipment via a public network after the power distribution equipment has been energized,
the authentication includes:
comparing identification information transmitted from the power distribution equipment to the high-order system with identification information stored in a storage unit of the high-order system; and
if the identification information transmitted from the power distribution equipment to the high-order system agrees with the identification information stored in the storage unit, storing an address, assigned to the power distribution equipment, in the storage unit in association with the identification information of the power distribution equipment to which the address is assigned,
the power distribution equipment that has been authenticated by the high-order system is configured to control and/or monitor an appliance to be electrically connected to the power distribution equipment, and
the high order system is configured to collect, from one or more pieces of the power distribution equipment, measuring information about the appliance that has been obtained by the power distribution equipment monitoring the appliance.

13. An appliance management method for making power distribution equipment, provided on a power supply channel, control and/or monitor an appliance to be electrically connected to the power distribution equipment, the appliance management method comprising:
an authentication step including allowing a high-order system to perform authentication on the power distribution equipment by making the power distribution equipment access the high-order system via a public network after the power distribution equipment has been energized; and a management step including making the power distribution equipment that has been authenticated in the authentication step control and/or monitor the appliance, wherein the management step includes transmitting data from the power distribution equipment toward a destination to which electric power is supplied from the power distribution equipment.

14. An appliance management method for making power distribution equipment, provided on a power supply channel, control and/or monitor an appliance to be electrically connected to the power distribution equipment, the appliance management method comprising:

an authentication step including allowing a high-order system to perform authentication on the power distribution equipment by making the power distribution equipment access the high-order system via a public network after the power distribution equipment has been energized; and a management step including making the power distribution equipment that has been authenticated in the authentication step control and/or monitor the appliance, wherein:

the power distribution equipment to be subjected to the authentication in the authentication step includes an outlet and a plug, and the management step includes making each of the outlet and the plug that have been authenticated control and/or monitor the appliance.

\* \* \* \* \*